United States Patent [19]

Kadooka et al.

[11] Patent Number: 5,428,685
[45] Date of Patent: Jun. 27, 1995

[54] IC MEMORY CARD AND METHOD OF PROTECTING DATA THEREIN

[75] Inventors: Yoshimasa Kadooka; Masayuki Ishizaki; Kazuo Satoh; Mariko Touyama; Yutaka Yunomura, all of Kawasaki, Japan

[73] Assignee: Fujitsu Limited, Kawasaki, Japan

[21] Appl. No.: 117,159

[22] PCT Filed: Jan. 21, 1993

[86] PCT No.: PCT/JP93/00074

§ 371 Date: Sep. 15, 1993

§ 102(e) Date: Sep. 15, 1993

[30] Foreign Application Priority Data

Jan. 22, 1992 [JP] Japan .................. 4-009098
Dec. 25, 1992 [JP] Japan .................. 4-346939

[51] Int. Cl.⁶ ............................................. H04K 1/00
[52] U.S. Cl. ............................................. 380/25; 320/4
[58] Field of Search .................. 380/3, 4, 23, 25; 235/380

[56] References Cited

U.S. PATENT DOCUMENTS

| | | | |
|---|---|---|---|
| 4,985,920 | 1/1991 | Seki | 380/23 |
| 5,068,894 | 11/1991 | Hoppe | 380/23 |
| 5,237,609 | 8/1993 | Kimura | 380/3 |
| 5,293,424 | 3/1994 | Holtey et al. | 380/23 |
| 5,319,705 | 6/1994 | Halter et al. | 380/4 |

FOREIGN PATENT DOCUMENTS

| | | |
|---|---|---|
| 60-89263 | 5/1985 | Japan . |
| 61-109144 | 5/1986 | Japan . |
| 61-208541 | 9/1986 | Japan . |
| 63-24339 | 2/1988 | Japan . |
| 1194029 | 8/1989 | Japan . |
| 223443 | 1/1990 | Japan . |
| 2112082 | 4/1990 | Japan . |
| 2293930 | 12/1990 | Japan . |
| 316883 | 1/1991 | Japan . |
| 4215194 | 8/1992 | Japan . |

*Primary Examiner*—David C. Cain

[57] ABSTRACT

A method of protecting data in an IC memory card (11) having a ROM area (11a) and a RAM area (11b) and used as an external storage medium of a computer system includes storing key data for preventing copying in the ROM area and using the key data to prevent the copying of data stored in the RAM area. For example, when a file is written, second key data (k1, k2, ... ), which is inserted into the headers (H1, H2, ...) of files (11c-1, 11c-2 ... ), is decided in such a manner that a fixed correlation will exist with respect to first key data (K1, K2, ... ) stored in the ROM area (11a), and the second key data is written in the RAM area (11b). When a file is read out of the IC memory card, a check is performed to determine whether the fixed correlation holds between the first key data that has been written in the ROM area and the second key data that has been inserting into the header of the file. The file is read out only if the fixed correlation holds.

37 Claims, 16 Drawing Sheets

IC MEMORY CARD AND METHOD OF PROTECTING DATA THEREIN

DESCRIPTION

1. Technical Field

This invention relates to an IC memory card used as an external storage medium of a computer system, as well as to a method of protecting data in the IC memory card.

2. Background Art

An IC memory card is a thin card, of a size equivalent to that of a business card, and is equipped with a memory. These cards, examples of which are ROM cards, RAM cards for managing data, etc., are advantageous in that they are compact, have a high access speed and are highly reliable. Such IC memory cards have been standardized by the PCMCIA (Personal Computer Memory Card International Association), whereby their mechanical shape, pin arrangement, data read and writing timings, etc., have been stipulated. In Japan also the standardization proposals of the PCMCIA have been adopted the JEIDA (Japan Electric Industry Development Association).

An information sales system is one example of a system in which an IC memory card is adopted at an external storage medium. In an information sales system, information for sale, such as newspapers, magazines and other publications in electronic form, is transferred, via a communication line, from an information center to automatic information vending machines disposed in various areas. The information is sold by being copied onto the IC memory card.

Computer systems in which an IC memory card serves as an external storage medium have been designed in accordance with the specifications of the PCMCIA. If all of these computer systems have the same operating system (OS), data can be written/read and copied at will from any IC memory card. More specifically, the data recorded on an IC memory card can readily be read/written by any personal computer or the like having a slot for the IC memory card, and information can readily be copied to another IC card by execution of a copy command. However, the fact that data created by oneself can be freely read/written by another individual and the content of the IC card can be copied at will is extremely inconvenient insofar as maintaining the confidentiality of stored information and protecting copyrights is concerned.

Accordingly, the practice in the prior art is to convert the address data of the memory card into a different address by encryption data possessed by the computer system and store data in a storage area designated by the converted address. If this expedient is adopted, the arrangement of data in the memory card is made random so that the data cannot be read out in the correct order by another computer system, thereby making it possible to enhance the confidentiality of data and to prevent copying.

There is available a system in which an IC memory card (master card) on which prescribed data has been recorded is rented, as in the manner of video software and CD software, as well as a system in which information is sold by being recorded on an IC memory card (which becomes the master card) brought in by the purchaser, as in the manner of an automatic information vending machine. In systems of this kind it is necessary to render data meaningless if it is copied from the master card and, if the card is the master card, to allow the data recorded on the card to be viewed using any computer system (terminal device). However, a problem encountered in the conventional systems is that these requirements cannot be satisfied.

Accordingly, an object of the present invention is to provide an IC memory card that is effective in preventing copying and protecting copyrights, as well as a method of protecting data in the card.

Another object of the present invention is to provide an IC memory card, as well as a method of protecting data in the card, in which even if data is copied from a master card, the data cannot be reproduced from the card copy.

A further object of the present invention is to provide an IC memory card which, if the card is a master card, is capable of having its recorded data reproduced by any computer system, as well as a method of protecting data in the card.

Still another object of the present invention is to provide an IC memory card in which confidentiality can be maintained to the maximum degree, as well as a method of protecting data in the card.

DISCLOSURE OF THE INVENTION

In a method of protecting data on an IC memory card having a ROM area and a RAM area and used as an external storage medium of a computer system, key data for preventing copying is stored in the ROM area of the IC memory card and the copying of data that has been stored in the RAM area of the IC memory card is prevented using the key data.

More specifically, when a file is written in a RAM area of an IC memory card, second key data, which is inserted into a header of the file, is decided and written in the RAM area in such a manner that a fixed correlation will exist with regard to first key data stored in a ROM area of the IC memory card. When a file is read out of the IC memory card, the first key data that has been written in the ROM area of the IC memory card is read out, the second key data that has been inserted in the header of the file is read out, and a check is performed to determine whether the fixed correlation holds between the first and second key data. Read-out of the file is allowed in a case where the fixed correlation holds and is inhibited in a case where the fixed correlation does not hold.

Further, first key data K1 is written in the ROM area of the IC memory card in advance and the first key data K1 is made to differ from one IC memory card to another. When data is written in the IC memory card, the data to be written in the IC memory card is written upon being encrypted using the first key data K1. When data is read out of the IC memory card, the read data is deciphered into the original data using the first key data.

Furthermore, the key data K2 is written in the ROM area of the IC memory card in advance and this key data is made to differ from one IC memory card to another. When data is written in the IC memory card, a data-storage destination address of the IC memory card is converted into another address using the key data K2 and data is written in the IC memory card at a location thereof indicated by the address obtained from this address conversion. When data is read out of the IC memory card, a data-read-out address is converted into another address using the key data K2 and data is read out of the IC memory card from a location thereof indicated by the address obtained from this address conversion.

Thus, as set forth above, it is so arranged that key data for preventing copying is stored in the ROM area of the IC memory card, and predetermined data is appended to a file stored in the RAM based upon this key data. Alternatively, data to be written in the RAM is encrypted or a data-storage address is converted. When data is read out, the original data is restored using the key data. If key data has not been stored in the ROM area, therefore, restoration of the original data cannot be carried out. As a result, even if a master card is copied, the key data that has been stored in the ROM area of the master card cannot be copied. This means that the original data cannot be recovered from the card copy, thereby rendering the copy meaningless.

Further, the first key data K1 is written in the ROM area of the IC memory card in advance. When data is written in the IC memory card, data to be written in the IC memory card is encrypted using the first key data K1, a data-storage destination address of the IC memory card is converted into another address using the key data K2 and the encrypted data is written in the IC memory card at a location thereof indicated by the address obtained from this address conversion. When data is read out of the IC memory card, a data-read-out address is converted into another address using the second key data K2 and data read out of the IC memory card from a location thereof indicated by the address obtained from this address conversion is deciphered into the original data using the first key data. Thus, data to be written in an IC memory card is encrypted and the address is converted into another address, thereby enhancing confidentiality.

BEST MODE FOR CARRYING OUT THE INVENTION

(a) First Embodiment of the Invention

Figure 1:
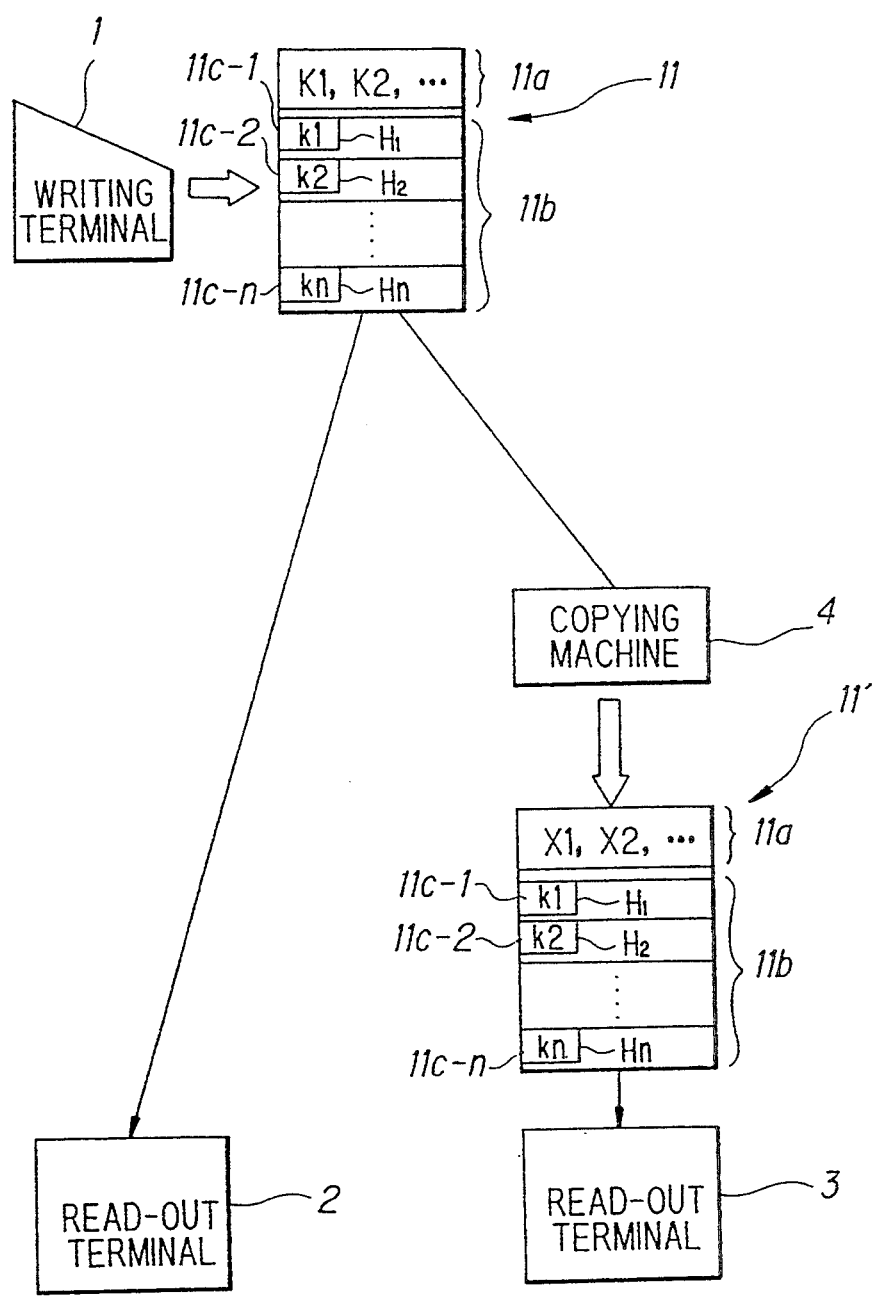
FIG. 1 is an explanatory view of a first embodiment of the present invention.

FIG. 1 is an explanatory view of a first embodiment of the present invention. Numeral 1 denotes a writing terminal; 2 and 3 read-out terminals; 4 a copying machine; 11 an IC memory card (master card); and 11' a card copy that has been copied from the master card. The IC memory card 11 is provided with an attribute memory area 11a serving as a ROM area, and a common memory area 11b serving as a RAM area. The attribute memory area 11a is an area which the PCMCIA stipulates may be provided. This memory area stores the type of IC memory card (whether it is a ROM card or RAM card), its capacity and other data, and it is stipulated that the maker can use this memory area freely. In this invention, first key data K1, K2, ... for preventing copying is written in the attribute memory area 11a. A number of files (newspapers, magazines, etc.) 11c-1, 11c-2, ... 11c-n are stored in the common memory area 11b, and the files are assigned respective headers H1, H2, ... Hn for specifying the file name, creation date, creator, etc. In this invention, second key data k1, k2, ... for preventing copying is written in respective headers.

Figure 2:
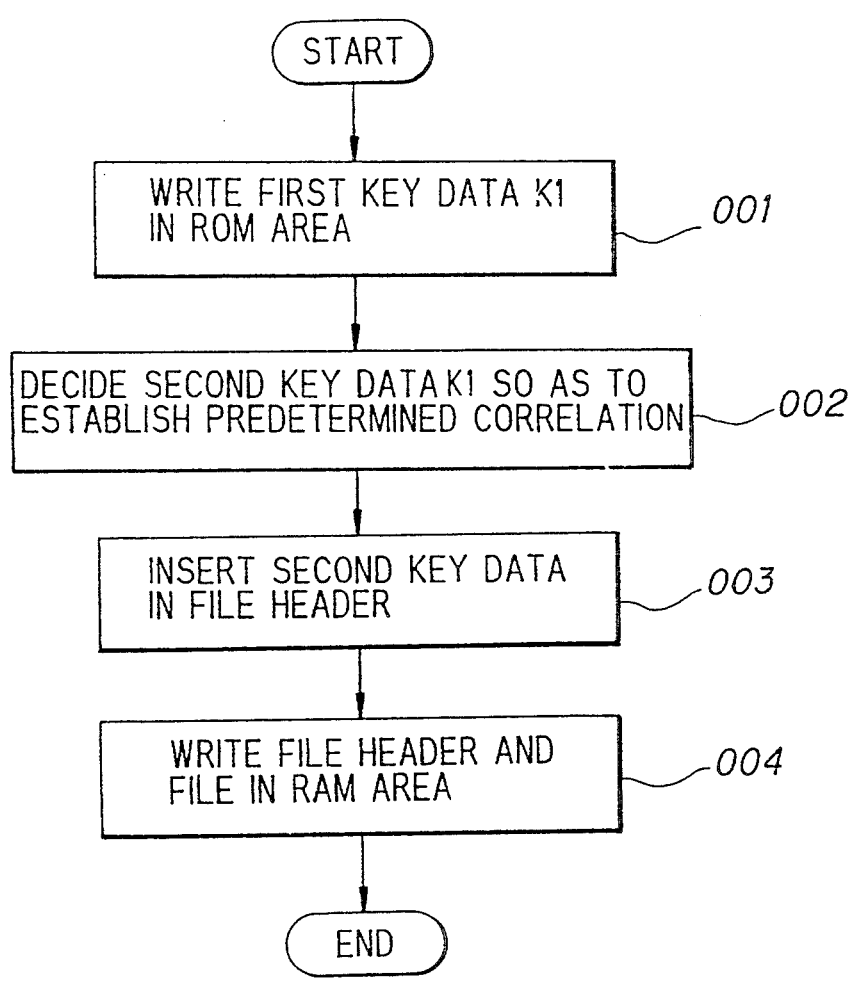
FIG. 2 is a flowchart for writing a file.
Figure 3:
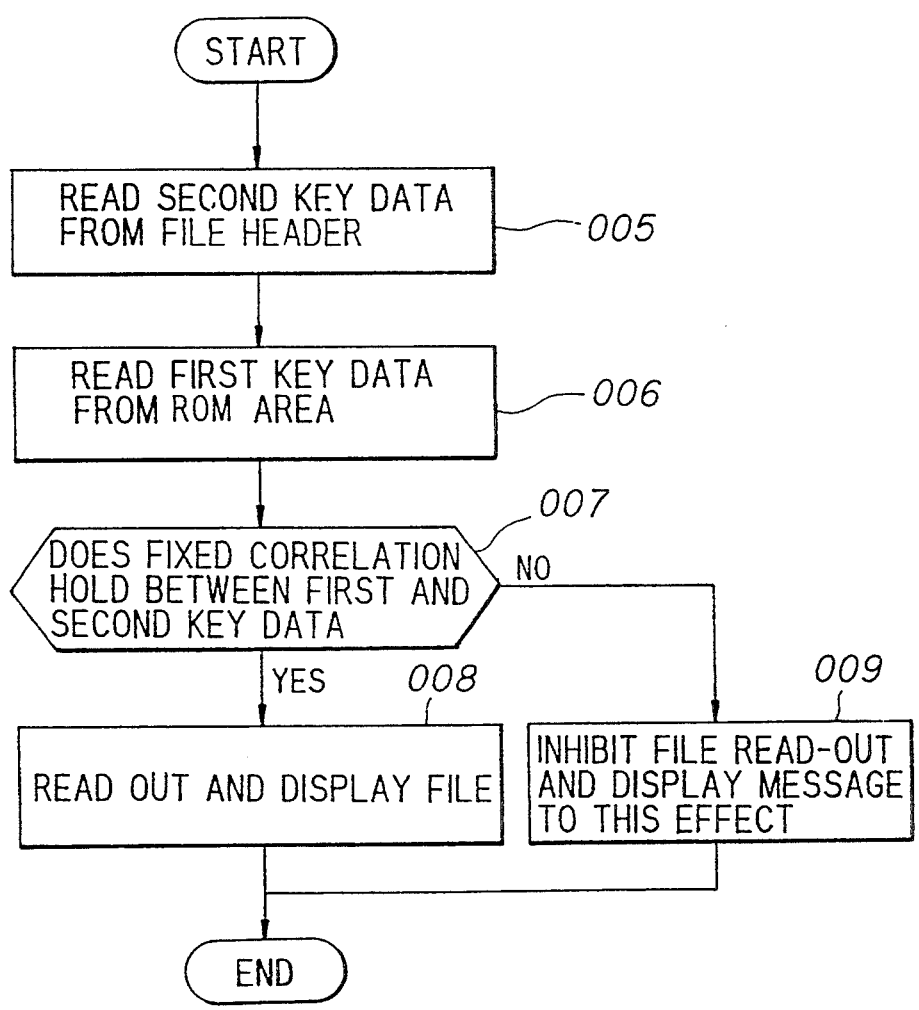
FIG. 3 is a flowchart of reading out a file.

FIG. 2 is a flowchart for writing a file, and FIG. 3 is a flowchart for reading out a file.

When the writing terminal 1 writes a file 11c-i (i=1, 2, ... n) in the common memory 11b of the IC memory card 11, the writing terminal 1 decides the first key data Ki for preventing copying and writes the first key data Ki in the attribute memory area 11a so as to correspond to the above-mentioned file (step 001). Next, the writing terminal 1 decides the second key data ki in such a manner that a fixed correlation is established with respect to the first key data Ki (step 002), inserts the second key data ki in the header Hi of the file 11c-i (step 003) and writes the header in the common memory area 11b in a form combined with the file (step 004). In a simple case, the fixed correlation may be a relation such as Ki=ki, by way of example.

When the read-out terminal 2 reads a prescribed file out of the IC memory card (master card) 11, the second key data that has been written in the header of this file is read out (step 005) and the first key data corresponding to this file, and which has been written in the attribute memory 11a, is read out (006). Next, the read-out terminal 2 checks to determine whether the aforesaid correlation holds between the first and second key data (step 007). If the fixed correlation holds, then the read-out terminal reads out the file and displays it (step 008). If the fixed correlation does not hold, the read-out terminal does not perform read-out and presents a display to this effect (step 009).

If the IC memory card is a master card, the aforementioned fixed correlation will hold between the first key data K1~Kn and the second key data k1~kn, and therefore read-out of the designated file is performed and the file is displayed on a display unit.

If the IC memory card is the card copy 11', however, the fixed correlation will not hold and read-out is refused as a result. More specifically, in a case where the card copy 11' is created from the master card 11 using the copy machine 4, only the content of the common memory area 11b can be copied and not the content of the attribute memory area 11a. As a consequence, the fixed correlation is not established between the first key data X1~Xn originally written in the attribute memory area 11a of the card copy 11' and the second key data k1~kn inserted in the headers H1~Hn of the files 11c-1~11c-n, and the read-out terminal 3 does not perform read-out from the card copy 11'.

Accordingly, read-out of a file from the IC memory card 11' obtained by copying the master card 11 cannot be performed. In essence this means that copying has not been achieved, thus making it possible to attain the object of preventing copying.

The above-mentioned copy-preventing function is implemented paying attention to one fact. This fact is that the common memory area 11b in the ID memory card be established as an area which the user can access freely while the attribute memory area 11a be established as an area which a general user cannot access freely. This means that an operation such as rewriting of the attribute memory area 11a can be performed only by a specific individual.

As a result, even if the master card 11 is copied and the card copy 11' created using the card copying machine 4 shown in FIG. 1, what can be copied is solely the files 11c-1~11c-n of the common memory area 11b; the first key data that has been written in the attribute memory area 11a is excluded from copying. Accordingly, the content (X1, X2 ...) of the attribute memory 11a originally possessed by the card copy 11' remains without be altered. Thus, the predetermined fixed correlation cannot be obtained between the second key data (k1, k2, ...) in the headers and the first key data (X1, X2 ...) in the attribute memory area 11a, and the read-out terminals 2, 3 are incapable of reading files from the card copy 11'.

There are cases in which the predetermined fixed correlation between the first and second key data in its simplest form is such that the first key data K1, K2, .. . and second key data k1, k2, ... are made exactly the same values. Further, values obtained by scrambling (encrypting) the first or second key data may be adopted as the second or first key data. In such case, however, it is required that the scrambling technique be common for both the writing terminal 2 and read-out terminal 3. If scrambling has been applied, a malicious user who attempts to rewrite the first key data in the attribute memory area 11a will find that the values to be rewritten are unknown. Accordingly, copying is prevented even more effectively.

Figure 4:
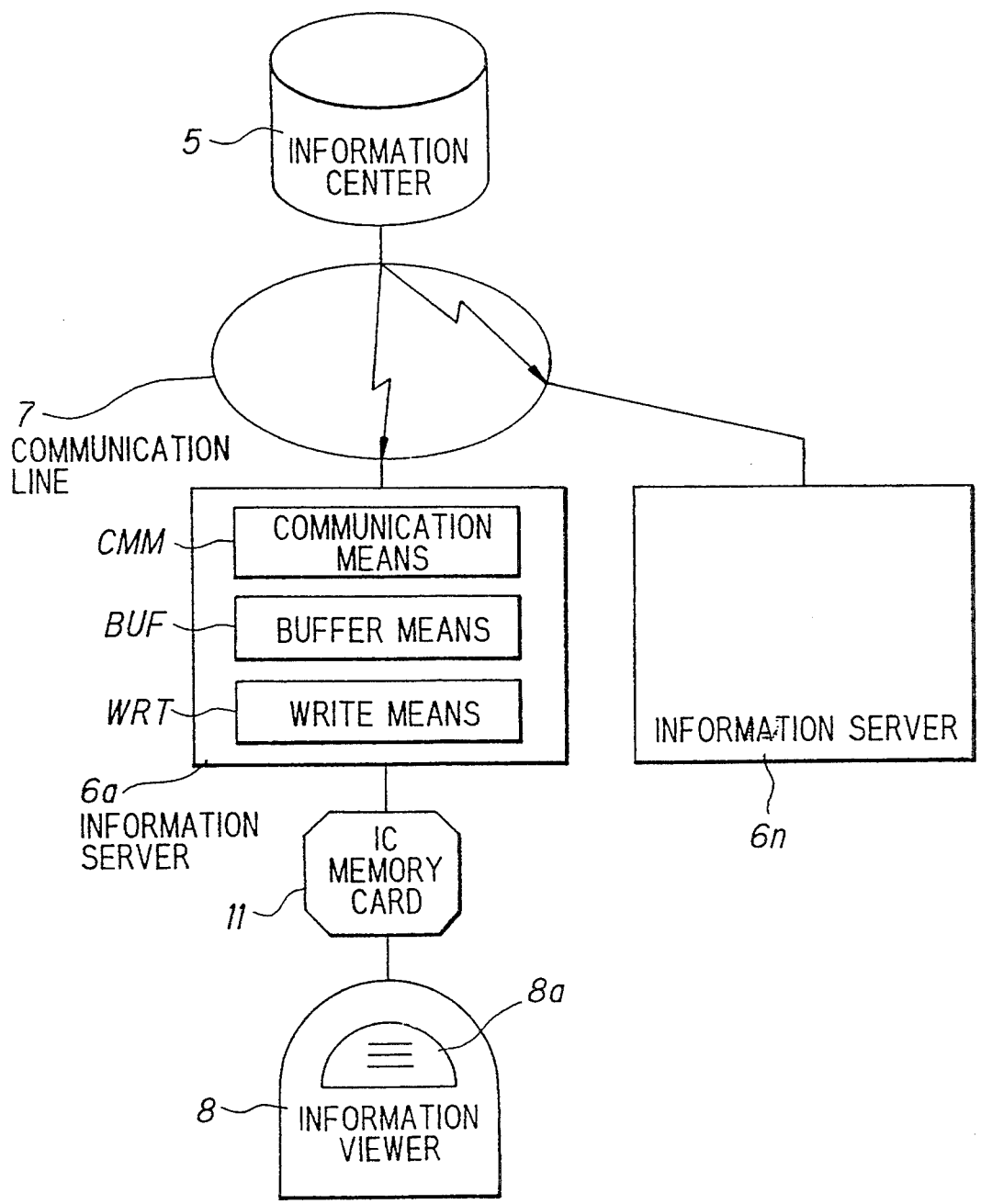
FIG. 4 is an explanatory view for a case in which the present invention is applied to an information sales system.

FIG. 4 shows an example in which the present invention is applied to an information sales system. The main elements of this information sales system are an information center 5, automatic information vending machines (information servers) 6a~6n, a communication line 7, a terminal device (information viewer) 8 and an IC memory card 11. The information servers 6a~6n correspond to the writing terminal 1 in FIG. 1, and the information viewer 8 corresponds to the read-out terminal in FIG. 1.

The information center 5 accumulates information for sale, such as newspapers, magazines and books, to be supplied to users. The information servers 6a~6n each have communication means CMM for communicating with the information center 5, buffer means BUF for temporarily holding information obtained via the communication means CMM, and write means WRT for writing information in the IC memory card 11. The information temporarily held by the information server is reproduced on the IC memory card 11. The information viewer 8, which has a receptacle for the IC memory card 11, reads the information in the IC memory card 11 and displays it for the user.

The information center 5, which stores information put into electronic form at a publishing company or newspaper company, ordinarily is placed at a location remote from users. It is the function of the information servers 6a~6n to bring the services of the information center 5 to the immediate vicinity of users. The information servers temporarily hold the information received from the information center 5 via the communication means CMM and provide the held information externally.

The user, who possesses the IC memory card 11, copies only the required information onto the IC memory card 11 at any of the information servers 6a~6n. Further, the user is capable of viewing and listening to the required information merely by holding the information viewer 8 and inserting the IC memory card into the information viewer 8.

More specifically, the information center 5 in the information sales system periodically transfers the information for sale, such as the newspapers and magazines in electronic form, via the communication line 7 to the information servers 6a~6n deployed at in various areas and stores this information in the buffer means BUF of each server. An individual wishing to purchase the information inserts the IC memory card 11 in any of the information servers 6a~6n, uses a sales control panel (not shown) to specify the information desired to be purchased and pays the required fee by cash or by using a pre-paid card or the like, whereupon the information server writes the specified information in the common area of the IC memory card 11 and then ejects the card. The purchaser inserts this IC memory card 11 into the information viewer 8 in the possession of the purchaser and then performs a prescribed operation, whereby the content of the information purchased is displayed on a display unit 8a so that it can be read.

The information viewer 8 may have a size equivalent to that of a compact portable television and makes it possible for the information to be viewed and listened to even on a train, for example. The information center 5 is capable of storing as many information sources as possible and there is no need to be concerned with whether or not sales in large quantities are possible.

Thus, the user basically possesses a single IC memory card and is capable of using it repeatedly any number of times. Even if the IC memory card is high in price, therefore, the card is economical since the cost per unit of information is low. Thus, even though the cost per unit of information is low, in actuality the IC memory card itself currently is high in price and the purchase of information itself entails expense. For these reasons it is only natural that a user would desire to copy and utilize the content of an IC memory card belonging to someone else. However, if such copying is left unchecked, there is the danger of copyright infringement. This is undesirable.

Here the copying-preventing function of the invention described above demonstrates its effectiveness. Copying is performed by having a personal computer execute, say, an MS-DOS copy command. In this case, it is presumed that the IC memory card used has been initialized by the MS-DOS format. Only the above-described common memory area 11b is the subject of copying. The information in the attribute memory area 11a is established at the time of initialization. The following two modes of initialization are considered:

The first mode is a case in which the IC memory card is initialized by the ordinary MS-DOS format. In this case, the first key data is not set. Therefore, when the IC memory card 11 has been set in the information viewer 8, establishing correlation with the above-described second data is impossible and read-out of information by the information viewer 8 is not possible.

The second mode is a case in which the IC memory card has already been initialized by a format specific to the present invention. More specifically, this mode represents a case in which the IC memory card is initialized once, in any of the information servers 6a~6n, in a format that incorporates the first key data, with some publication-related information or the like already being contained in the common memory area 11b. In such case, when a copy is made using the MS-DOS format of a personal computer, only the second key data in the card copy is transposed upon the second key data in the master card 11. Consequently, the second data will not have the fixed correlation with respect to the first key data originally provided in the attribute memory area 11a of the copy card 11'. As a result, the information viewer 8 will not read files out of the card copy.

It should be noted that the foregoing is for a case in which the first key data is written in the attribute memory area 11a when a file is written in the writing terminal 1 or any of the information servers 6a~6n. However, depending upon the IC memory card, there are instances in which data cannot be written in the attribute memory area 11a at a later time. This case will be described next.

When an IC memory card is shipped, the first data K1 for preventing copying is written in the attribute memory area 11a (see FIG. 1) in advance and the first key data K1 is made to differ for each and every IC memory card. It should be noted that when the first key data is composed of two bytes, this data can be of $2^{16}$ types.

When the writing terminal 1 writes a file in the common memory area 11b of the IC memory card 11, the first key data K1 that has been written in the attribute memory area 11a beforehand is read out, the second key data k1 is decided in such a manner that it will have the fixed correlation with respect to the first key data K1, the second key data k1 is inserted into the header of the file and the file is then written in the common memory area 11b.

Further, when the read-out terminal 2 reads a file out of the IC memory card, the terminal reads out the second key data that has been written in the header of this file as well as the first key data that has been written in the attribute memory area 11a, and checks to determine whether the fixed correlation holds between the first and second key data. The read-out terminal reads out the file and displays it on the display unit if the fixed correlation holds but does not read out the file if the fixed correlation does not hold, in which case a display to this effect is presented on the display unit, by way of example.

If the card is a master card, the fixed correlation will hold between the first and second key data K1, k1 and therefore the read-out terminal 2 reads out the file and displays it on the display unit. However, if the card copy 11' is created from the master card 11 by the copying machine 4, the first key data that has been written in the attribute memory area 11a of the copy card 11' will be the first key data X1 and the fixed correlation between the first and second key data X1, k1 will not hold. This means that the read-out terminal 3 will not read out the file.

(b) Second Embodiment of the Invention

FIG. 5 is an explanatory view of a second embodiment of the present invention.

Numeral 11 denotes the IC memory card in the attribute memory area of which first key data K1 for encryption/decipherment and second key data K2 for address conversion is stored in advance. Numeral 12 denotes a processor (CPU) of a computer system; 13a an encryption unit for applying an encryption operation to data D written in the IC memory card and an address converting operation to a storage-destination address A2; 13b a deciphering unit for applying a deciphering operation to data D' read out of the IC memory card; 14 a main memory device (RAM); and 15 a pattern generator. When data is written in and read out of the IC memory card 11, the pattern generator 15 loads the first key data K1 as initial pattern data and thereafter generates pattern data P that differs in regular succession. Numeral 16 denotes a read/write controller for writing in encrypted data or reading out encrypted data at a position on the IC memory card indicated by an address obtained by address conversion.

Figure 5A:
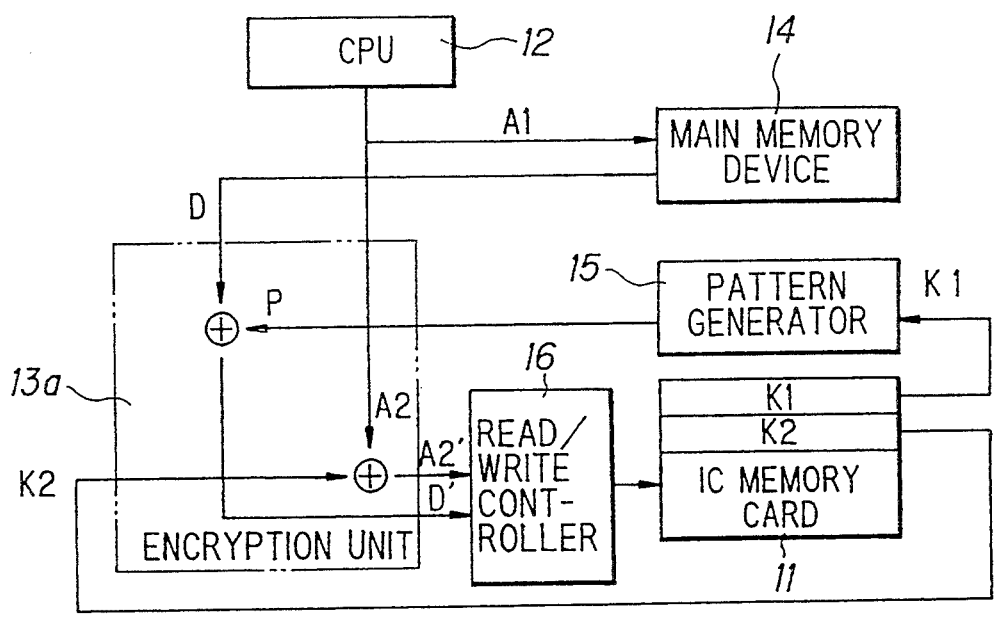
FIG. 5 is an explanatory view of a second embodiment of the present invention.

In the writing of data in the IC memory card 11 [see FIG. 5(a)], the first key data K1 that has been written in the attribute memory area in advance is loaded in the pattern generator 15 as initial pattern data and the pattern generator 15 generates the successively different pattern data P for every item of written data. The encryption unit 13a performs the encryption operation using the data D written in the IC memory card 11 and the pattern data P outputted by the pattern generator 15. The encryption unit 13a performs the address conversion operation using the second key data K2, which has been written in the attribute memory area, and a storage-destination address A2, and the read/write controller 16 writes the encrypted data D' in the IC memory card at the location thereof indicated by an address A2' obtained by the address conversion.

Figure 5B:
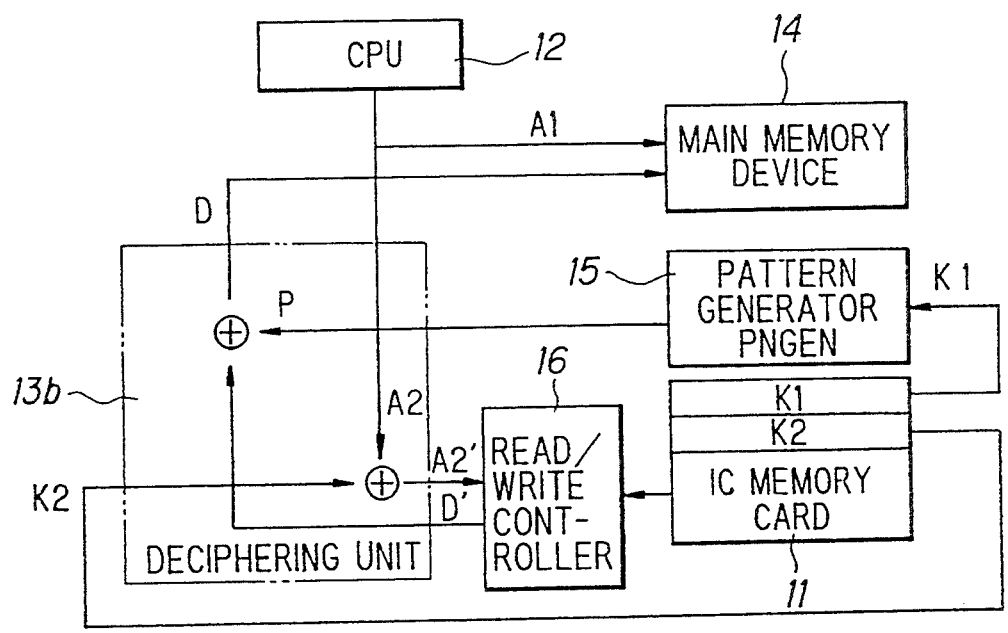

In the reading of data out of the IC memory card 11 [see FIG. 5(b)], the first key data K1 is loaded in the pattern generator 15 as initial pattern data and the pattern generator 15 generates a string of pattern data the same as that generated when data was written. The deciphering unit 13b performs the address conversion operation using the data read-out address A2 and the second key data K2. The read/write controller 16 reads the encrypted data D' out of the location of the IC memory card 11 indicated by the conversion address A2'. The deciphering unit 13b, which performs the deciphering operation using the read encrypted data D' and the pattern data P outputted by the pattern generator 15, stores the recovered data in the main memory device 14. It should be noted that an exclusive-OR operation or addition/subtraction operation can be employed as the operations for encryption and decipherment.

Figure 6:
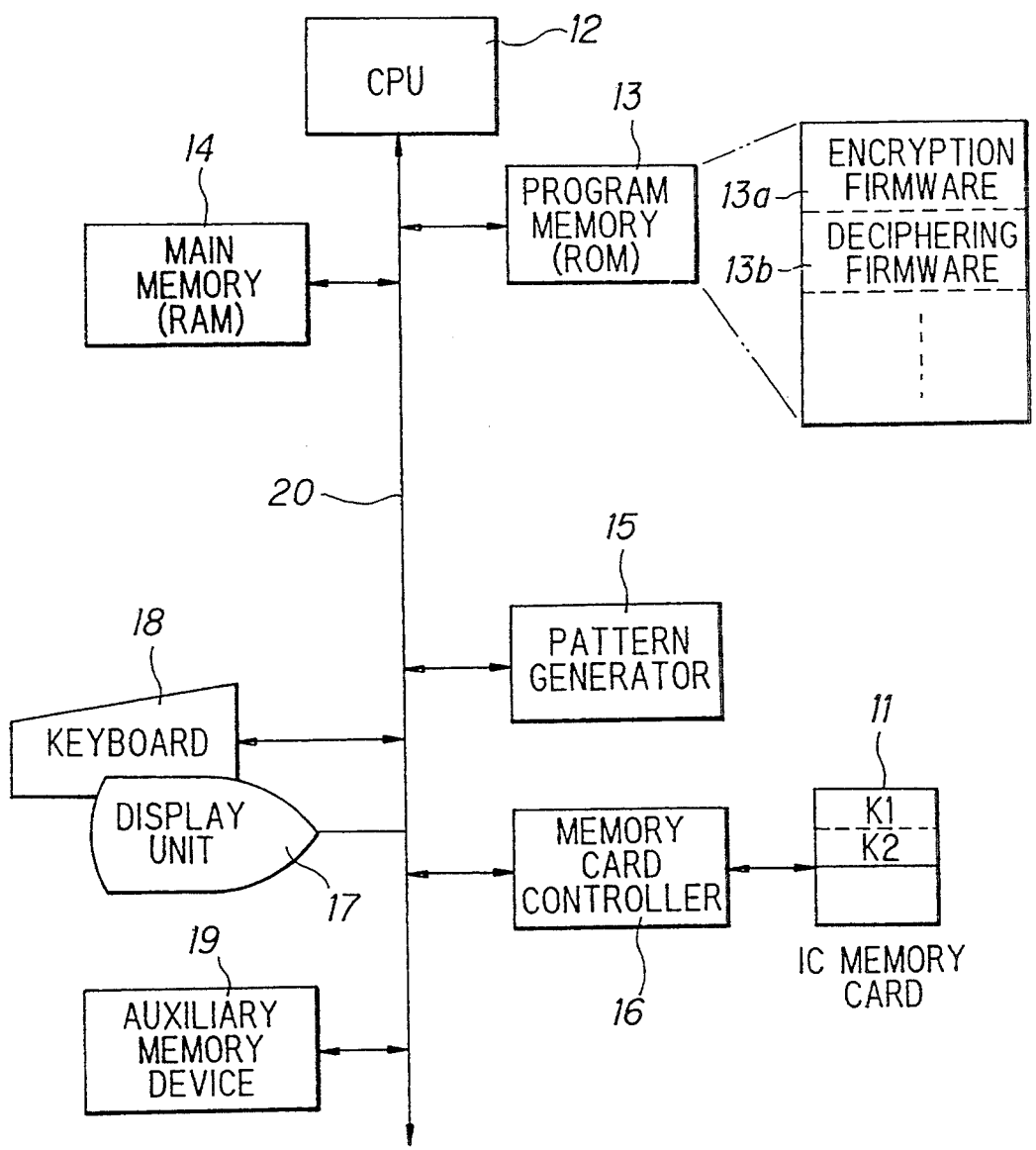
FIG. 6 is a block diagram of the second embodiment of the present invention.

FIG. 6 is a block diagram of a second embodiment of the present invention.

Numeral 11 denotes the IC memory card serving as an external storage medium; 12 the processor (CPU) of the computer system; 13 a program memory (ROM) for storing various software for control; 13a encryption firmware (encryption unit) for encrypting data written in the IC memory card 11 and converting a write address into another address; 13b deciphering firmware (deciphering unit) for deciphering data, which has been read from the IC memory card, into the original data; 14 the main memory device (RAM) for storing data; 15 the pattern generator for generating pattern data used when encrypting and deciphering data; 16 the memory-card controller (read/write controller) for writing in encrypted data at a location on the IC memory card indicated by an address obtained by address conversion and for reading out encrypted data from a location on the IC memory card; 17 a display unit such as a CRT or liquid-crystal panel; 18 a keyboard; 19 an auxiliary memory device such as a hard disk or floppy disk; and 20 a bus.

When writing data in the IC memory card 11 and reading data out of the IC memory card, the pattern generator 15 loads first key data K1, described later, as initial pattern data and generates successively different pattern data for each item of read/written data. The encryption firmware (encryption unit) 13a encrypts data, which is written in the IC memory card 11, using the pattern data outputted by the pattern generator 15, and the deciphering firmware (deciphering unit) 13b deciphers the encrypted data, which has been read out of the IC memory card 11, into the original data using the pattern data.

IC Memory Card

Figure 7:
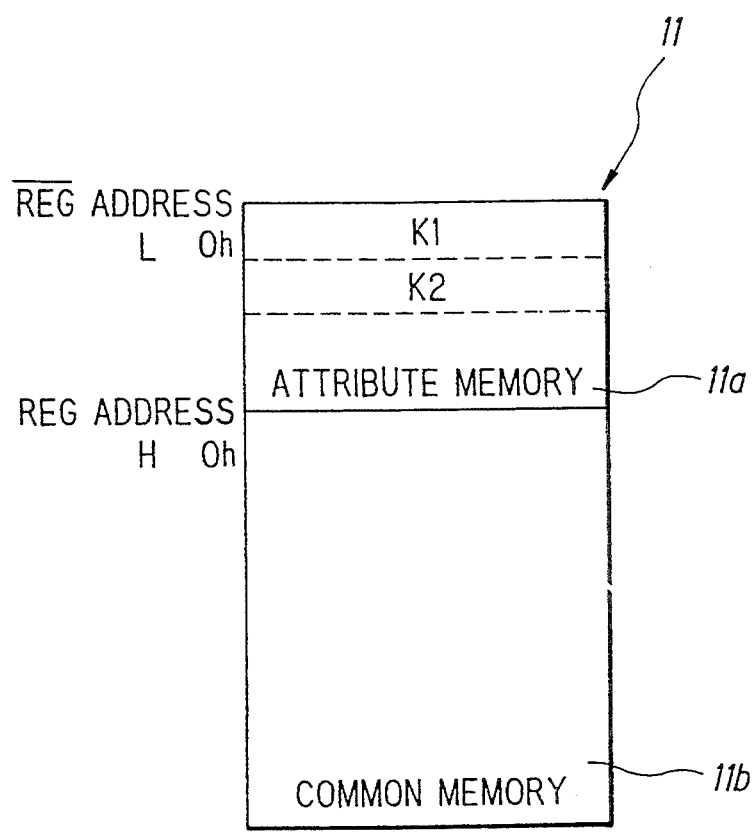
FIG. 7 is an explanatory view of memory space of an IC memory card.

As shown in FIG. 7, the IC memory card 11 is provided with the attribute memory area 11a serving as a ROM area, and the common memory area 11b serving as a RAM area. The memory spaces of the attribute memory area 11a and common memory area 11b are designated by a combination of a one-bit REG and address data. The attribute memory area is designated in case of REG="0", and the common memory area is designated in case of REG="1". First key data K1 for encrypting data written in the common memory area 11b and second key data K2 used in address conversion are written in prescribed storage areas of the attribute memory area 11a.

By way of example, the first key data K1 is composed of two bytes and the second key data K2 is composed of one byte. There are $2^{16}$ types of the first key data K1 and $2^8$ types of the second key data K2. The items of first and second key data K1, K2 written in each of the IC memory cards differ from one IC memory card to another.

Pattern Generator

Figure 8:
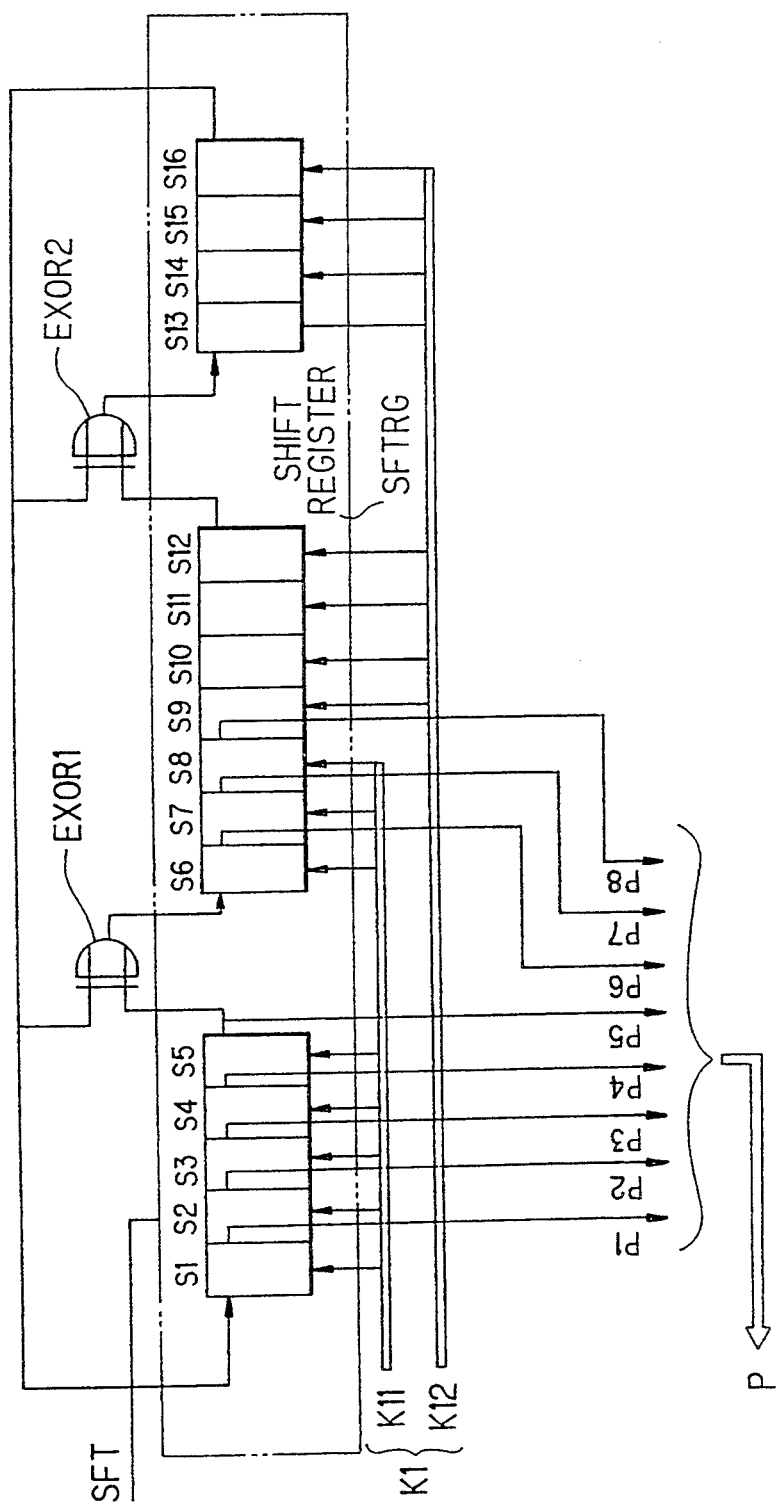
FIG. 8 is a diagram of the construction of a pattern generator.

As shown in FIG. 8, the pattern generator 15 has a shift register SFTRG of 16-bit construction, and two exclusive-OR gates (EXOR gates) EXOR1, EXOR2. In the shift register SFTRG, the output of each stage in principle is connected to the input of the succeeding stage, and the output of the last stage is connected to the input terminal of the first stage. Further, the output of a fifth stage S5 and the output of a last stage S16 of the shift register SFTRG enter the exclusive-OR gate EXOR 1, and the output of this gate is connected to the input terminal of a sixth stage S6. The output of a 12th stage S12 and the output of the last stage S16 enter the exclusive-OR gate EXOR 2, and the output of this gate is connected to the input terminal of a 13th stage S13.

When data is written in the IC memory card 11 and when data is read out of the IC memory card, the first key data K1 of two bytes (16 bits) is initially set in each state of the shift register SFTRG, after which the stored contents are shifted whenever a shift command SFT is generated, so that the pattern data P (p1~p8) of one byte is outputted from the first stage S1 through the eighth stage S8.

More specifically, in accordance with a polynomial $(1+x^5+x^{12}+x^{16})$, the pattern generator 15 successively generates the pattern data P, each item of which differs at a period T at which the shift command is generated, and outputs an identical pattern data string every N·T. It can be so arranged that a shift of more than two bits is made in response to the shift command.

Encryption processing and deciphering processing will now be described.

Encryption Processing

Figure 9:
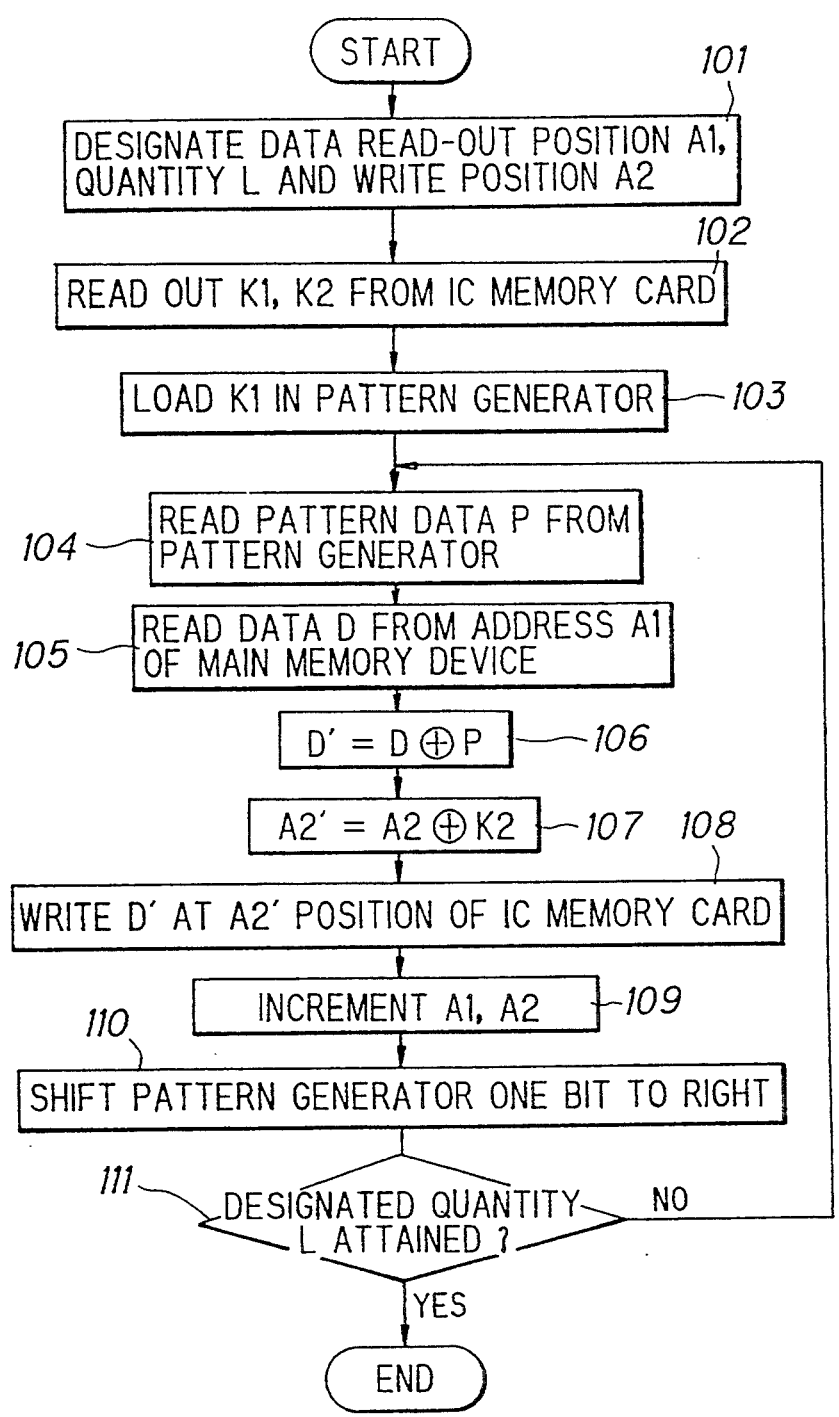
FIG. 9 is a flowchart of encryption.

FIG. 9 is a flowchart of encryption processing performed by the encryption firmware 13a. It will be assumed that a file that has been stored in the main memory device 14 is written in the IC memory card 11 in units of one byte.

When a command is generated for writing a prescribed file, which has been stored in the main memory device 14, in the IC memory card 11, the CPU 12 decides, in accordance with the encryption firmware 13a, a read starting position A1 regarding data constructing a file, a data quantity L and a head write-in address A2 of the IC memory card 11 (step 101).

Next, the items of first and second key data K1, K2 are read out of the attribute memory area 11a of the IC memory card (step 102) and the first key data K1 is loaded in the pattern generator 15 (step 103).

Next, the pattern data P of one byte is read from the pattern generator 15 and held (step 104) and the data D of one byte is read out of address A1 of the memory device 14 (step 105).

The CPU 12 then executes the exclusive-OR operation between corresponding bits of the data D and pattern data P to perform encryption (step 106) and executes the exclusive-OR operation between corresponding bits of the lower order byte of the write address A2 and the second key data K2 to perform an address conversion (step 107).

When the encrypted data D' and the converted address A2' are obtained, the encrypted data D' is written in a storage area of the IC memory card 11 designated by the address A2' (step 108).

When the write operation is concluded, the CPU 12 increments the read address A1 and the write address A2 (step 109), outputs the shift command to the pattern generator 15 and causes the contents of the shift register SFTRG (see FIG. 8) to be shifted one bit to the right (step 110).

The CPU thenceforth increments a write-data count TLCNT (the initial value of which is 0) and checks to determine whether the write-data count has become equal to the data quantity L (step 111). If TLCNT=L holds, processing for writing the file is concluded. If TLCNT<L holds, however, the program returns to step 104 and similar processing is repeated with regard to the next item of data. All of the data is eventually encrypted and written in the address resulting from the address conversion.

Deciphering Processing

Figure 10:
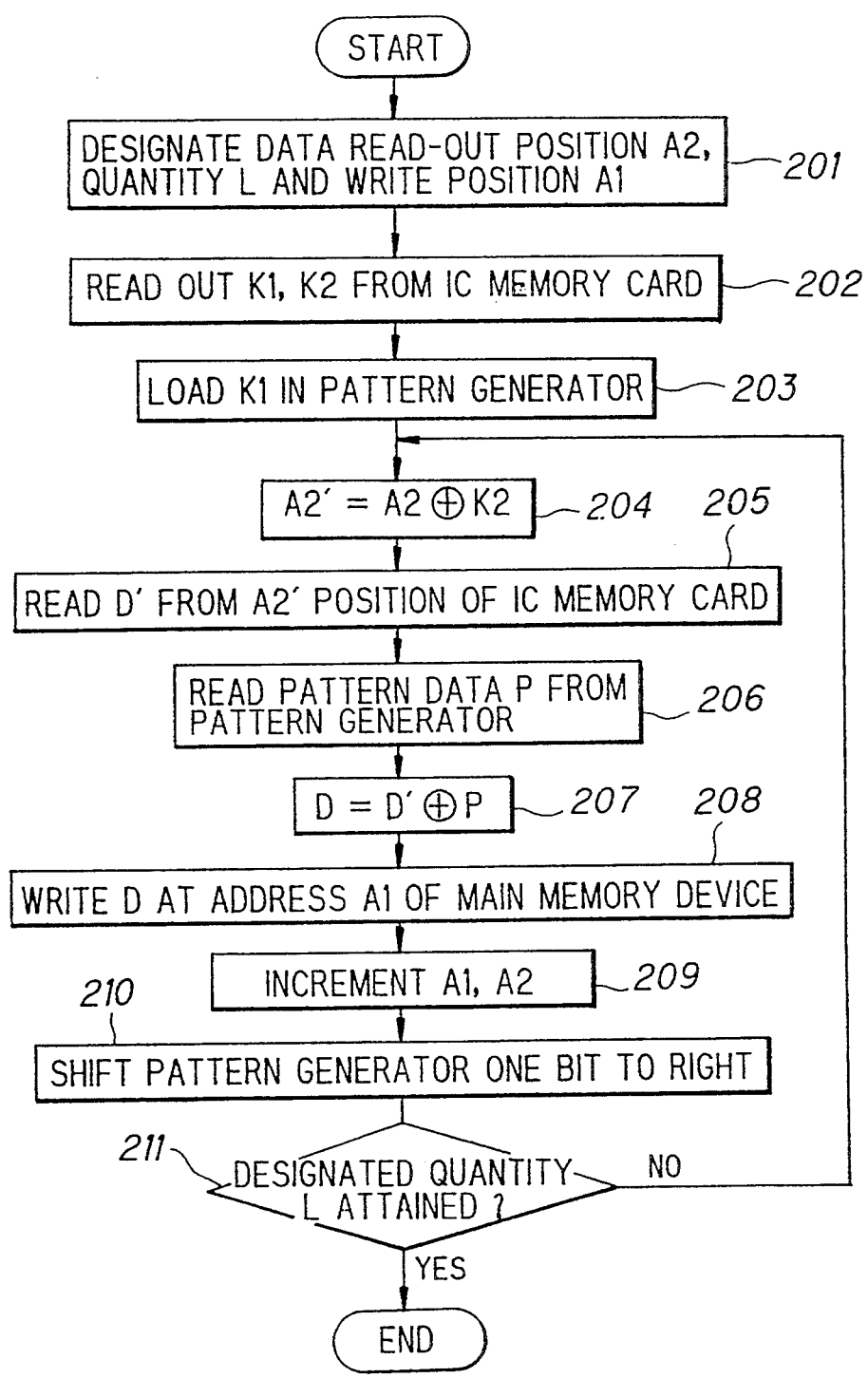
FIG. 10 is a flowchart of deciphering.

FIG. 10 is a flowchart of deciphering processing performed by the deciphering firmware 13b. This is for a case in which a file that has been stored in the IC memory card 11 is read out to the main memory device 14.

When a command is generated for reading a prescribed file, which has been stored in the IC memory card 11, out to the main memory device 14, the CPU 12 decides, in accordance with the deciphering firmware 13b, a read starting position A2 of the file, a data quantity L and a head write-in address A1 in the main memory device (step 201).

Next, the items of first and second key data K1, K2 are read out of the attribute memory area 11a of the IC memory card (step 202) and the first key data K1 is loaded in the pattern generator 15 (step 203).

Next, the CPU 12 executes the exclusive-OR operation between corresponding bits of the lower order byte of the read address A2 and the second key data K2 to perform an address conversion (step 204) and reads the data D' out of the IC memory card 11 from the storage area thereof designated by the address A2' obtained by the address conversion (step 205). It should be noted that the data D' was encrypted at the time of the writing operation.

The CPU 12 thenceforth reads the pattern data P of one byte from the pattern generator 15 (step 206) and executes the exclusive-OR operation between corresponding bits of the data D' and pattern data P to perform deciphering (step 207).

When the original data D is obtained by decipherment, the data is stored at address A1 of the main memory device 14 (step 208), the CPU increments the read address A2 of the IC memory card and the write address A1 of the main memory device (step 209), outputs the shift command to the pattern generator 15 and causes the contents of the shift register SFTRG to be shifted one bit to the right (step 210).

The CPU thenceforth increments a read-data count TLCNT (the initial value of which is 0) and checks to determine whether the read-data count has become equal to the data quantity L (step 211). If TLCNT=L holds, processing for reading the file is concluded. If TLCNT<L holds, however, the program returns to step 204 and similar processing is repeated with regard to the next item of data. The file is read out of the main memory device while all of the data is eventually deciphered.

Though the second key data K2 is one byte, two bytes may be used.

Thus, data written in an IC memory card is encrypted and the encrypted data is written at an address obtained by an address conversion. This enhances confidentiality.

The items of first and second key data K1, k2 are written in the ROM area of the IC memory card in advance, and the items of first and second key data written in each memory card are made to differ from those written in other IC memory cards. Accordingly, even if data recorded in the RAM area of a master card is copied onto another IC memory card, the items of first and second key data that prevailed at encryption will differ from the items of first and second data that have been stored in the ROM of the card copy; hence, the original data cannot be recovered from the card copy. As a result, even if the master card is copied, the copy has no meaning. Thus, copying can be prevented.

From the viewpoint of preventing copying, storing both of the items of first and second key data K1, K2 in the ROM area of the IC memory card is unnecessary; only one need be stored. In other words, an arrangement can be adopted in which only the first key data K1 is written in the absolute memory area 11a of the IC memory card 11 beforehand and the first key data K1 is made to differ for each and every IC memory card. When data is written in common memory area 11b of the IC memory card, the data to be written in the IC memory card is written upon being encrypted through the above-described method using the first key data K1. When data is read out of the IC memory card, the read data is deciphered into the original data through the above-described method using the first key data K1.

Further, an arrangement can be adopted in which only the second key data K2 is written in the absolute memory area 11a of the IC memory card 11 beforehand and the second key data K2 is made to differ for each and every IC memory card. When data is written in the common memory area 11b of the IC memory card 11, the destination address for data storage in the IC memory card is converted into another address and the data is written in the IC memory card at the location thereof indicated by the address obtained by the address conversion. When data is read out of the IC memory card 11, the data read-out address is converted into another address using the second key data K2 and data is read out of the IC memory card from the location thereof indicated by the address obtained by the above-mentioned address conversion.

(c) Modification

The pattern generator 15 (FIG. 8) shifts the contents of the shift register SFTRG to the right one bit at a time each time the shift command SFT is generated, thereby generating pattern data that differs in regular succession. When a shift of N times is repeated, the initial state is restored. The same operation is then repeated.

There are cases in which it is desired to verify the M-th item of data from the head of a certain file. In such case, the encrypted data D' must be read out of the IC memory card 11 and deciphered. The pattern data P necessary for decipherment is obtained by performing a shift M times after the first key data K1 is loaded in the pattern generator 15. When M is large, however, a considerable amount of time is needed to obtain the desired pattern data. In particular, since the number of bits in the shift register is 16, there are cases in which M becomes a very large number. This means that verifying the data takes too much time.

Accordingly, in a case where data is written in the IC memory card 11 upon being encrypted, it is so arranged that the first key data K1 is loaded in the pattern generator 15 whenever a predetermined number m of items of data is written. If this arrangement is adopted, the pattern data P outputted by the pattern generator 15 will be an identical pattern-data string repeated at the period m. Accordingly, the pattern data P necessary for decipherment will be obtained by performing a maximum of m shifts after loading of the first key data K1 in the pattern generator. This will make it possible to verify the data in a short period of time.

Figure 11:
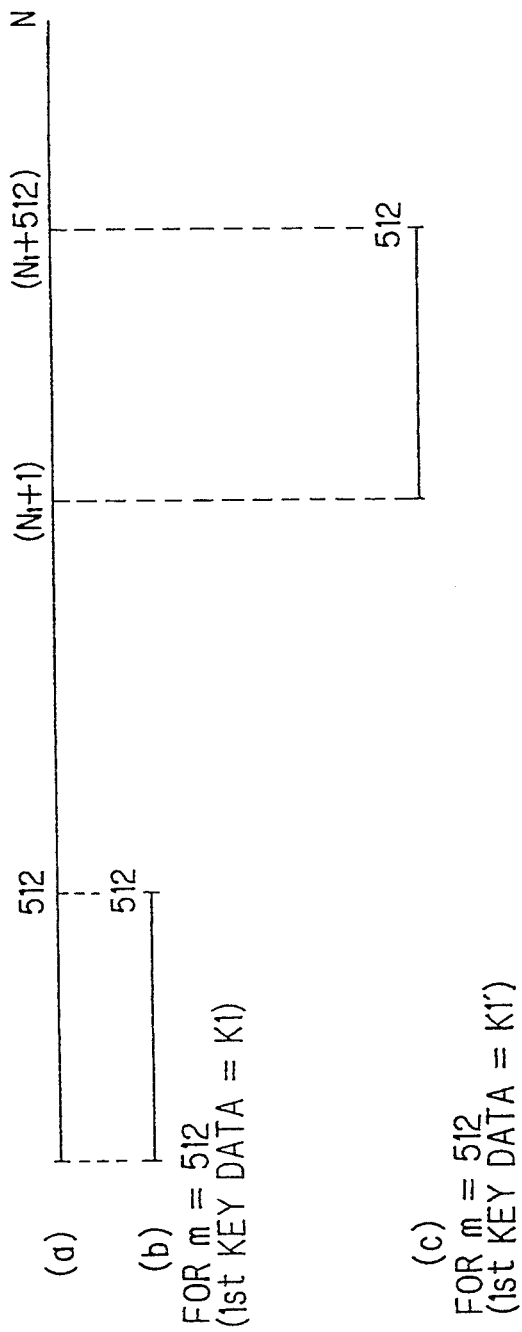
FIG. 11 is an explanatory view of repetition of pattern data.

FIG. 11 is an explanatory view of repetition of pattern data, in which (a) shows a case in which the first key data K1 is set only at the start of writing, (b) shows a case in which the first key data K1 is set whenever m (=512) items of data are written, and (c) a case in which the first key data K1' ($\neq$K1) is set whenever m (=512) items of data are written.

In the case of FIG. 11(a), an identical pattern-data string is repeated at the period N. In the cases of FIGS. 11(b), (c), an identical pattern-data string is repeated at the period m (=512). Further, as will be evident from FIGS. 11(b), (c), the pattern-data strings generated can be made to differ by making the first key data K1, K1' differ. Accordingly, pattern data rich in variety can be outputted by changing K1, m. Moreover, verification of the data can be performed in a short period of time.

Encryption Processing

Figure 12:
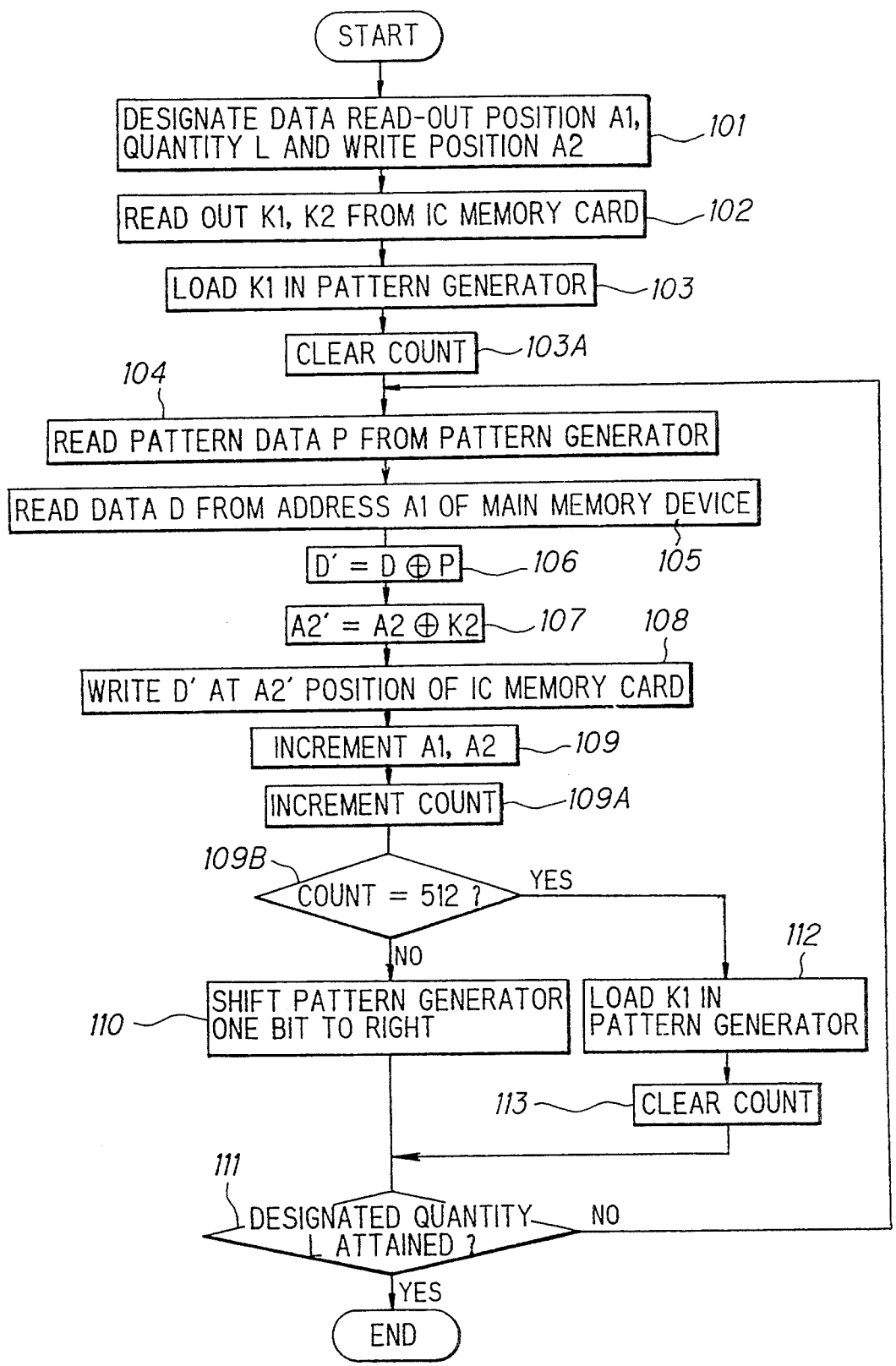
FIG. 12 is a flowchart of encryption in a modification.

FIG. 12 is a flowchart of encryption processing in a modification. Steps in the flow identical with those shown in FIG. 9 are designated by like step numbers.

When a command is generated for writing a prescribed file, which has been stored in the main memory device 14, in the IC memory card 11, the CPU 12 decides, in accordance with the encryption firmware 13a, a read starting position A1 regarding data constructing a file, a data quantity L and a head write-in address A2 of the IC memory card 11 (step 101).

Next, the items of first and second key data K1, K2 are read out of the attribute memory area 11a of the IC memory card (step 102) and the first key data K1 is loaded in the pattern generator 15 (step 103).

The CPU 12 subsequently clears the write-data count COUNT to zero (step 103A), reads and holds the pattern data P of one byte from the pattern generator 15 (step 104) and reads the data D of one byte out of address A1 of the memory device 14 (step 105).

The CPU 12 then executes the exclusive-OR operation between corresponding bits of the data D and pattern data P to perform encryption (step 106) and executes the exclusive-OR operation between corresponding bits of the lower order byte of the write address A2 and the second key data K2 to convert the address A2 to the address A2' (step 107).

When the encrypted data D' and the converted address A2' are obtained, the encrypted data D' is written in a storage area of the IC memory card 11 designated by the address A2' (step 108).

When the write operation is concluded, the CPU 12 increments the read address A1 and the write address A2 (step 109). The CPU 12 then increments COUNT (step 109A) and determines whether COUNT=512 holds (step 109B). If COUNT<512 holds, the CPU outputs the shift command to the pattern generator 15 and causes the contents of the shift register SFTRG (see FIG. 8) to be shifted one bit to the right (step 110). The CPU thenceforth increments the write-data count TLCNT (the initial value of which is 0) and checks to determine whether the write-data count has become equal to the data quantity L (step 111). If TLCNT=L holds, processing for writing the file is concluded. If TLCNT<L holds, however, the program returns to step 104 and similar processing is repeated with regard to the next item of data.

If COUNT=512 holds at step 109B, the CPU loads the first key data K1 in the pattern generator 15 (step 112), clears COUNT to 0 (step 113), increments the total write-data count TLCNT and executes the processing of step 111.

Deciphering Processing

Figure 13:
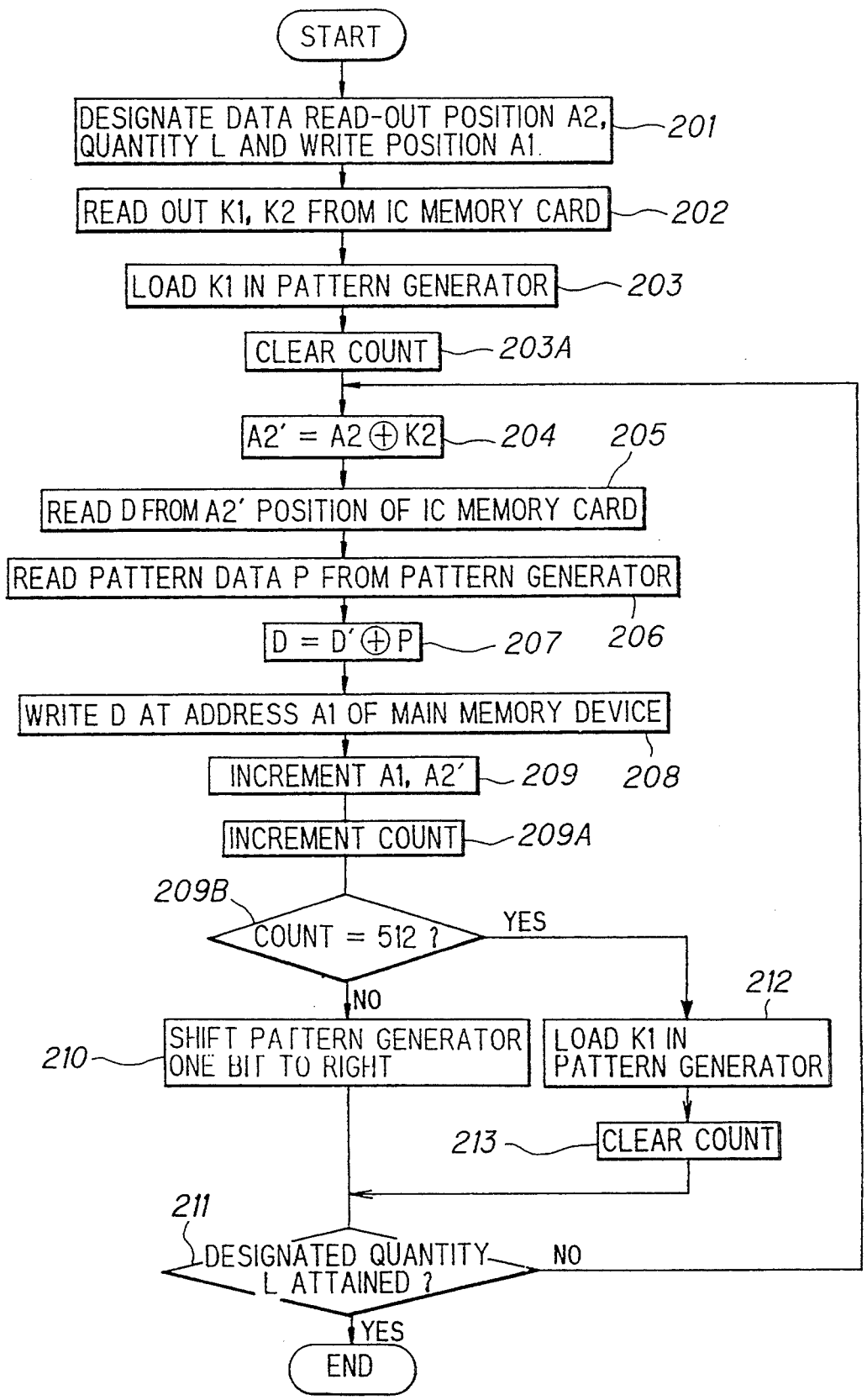
FIG. 13 is a flowchart of deciphering in a modification.

FIG. 13 is a flowchart of enciphering processing in a modification. Steps in the flow identical with those shown in FIG. 10 are designated by like step numbers.

When a command is generated for reading a prescribed file, which has been stored in the IC memory card 11, out to the main memory device 14, the CPU 12 decides, in accordance with the deciphering firmware 13b, a read starting position A2 of the file, a data quantity L and a head write-in address A1 in the main memory device (step 201).

Next, the items of first and second key data K1, K2 are read out of the attribute memory area 11a of the IC memory card 11 (step 202), the first key data K1 is loaded in the pattern generator 15 (step 203) and a read-data count COUNT is cleared to zero (step 203A).

The CPU 12 subsequently executes the exclusive-OR operation between corresponding bits of the read address A2 and the second key data K2 to convert the address A2 to the address A2' (step 204) and reads the encrypted data D' out of the IC memory card 11 from the storage area thereof designated by the address A2' obtained by the address conversion (step 205).

The CPU 12 then reads the pattern data P of one byte from the pattern generator 15 (step 206) and executes the exclusive-OR operation between corresponding bits of the data D' and pattern data P to perform deciphering (step 207).

When the original data D is obtained by decipherment, the data is stored at address A1 of the main memory device 14 (step 208), the CPU increments the read address A2 of the IC memory card and the write address A1 of the main memory device (step 209). The CPU then increments COUNT (step 209A) and determined whether COUNT=512 holds (step 209B). If COUNT<512 holds, the CPU outputs the shift command to the pattern generator 15 and causes the contents of the shift register SFTRG to be shifted one bit to the right (step 210).

The CPU thenceforth increments the read-data count TLCNT (the initial value of which is 0) and checks to determine whether the read-data count has become equal to the data quantity L (step 211). If TLCNT=L holds, processing for reading the file is concluded. If TLCNT<L holds, however, the program returns to step 204 and similar processing is repeated with regard to the next item of data.

If COUNT=512 holds at step 209B, the CPU loads the first key data K1 in the pattern generator 15 (step 212), clears COUNT to 0 (step 213), increments the total write-data count TLCNT and executes the processing of step 111.

(d) Third Embodiment of the Invention

Overall Configuration

Figure 14:
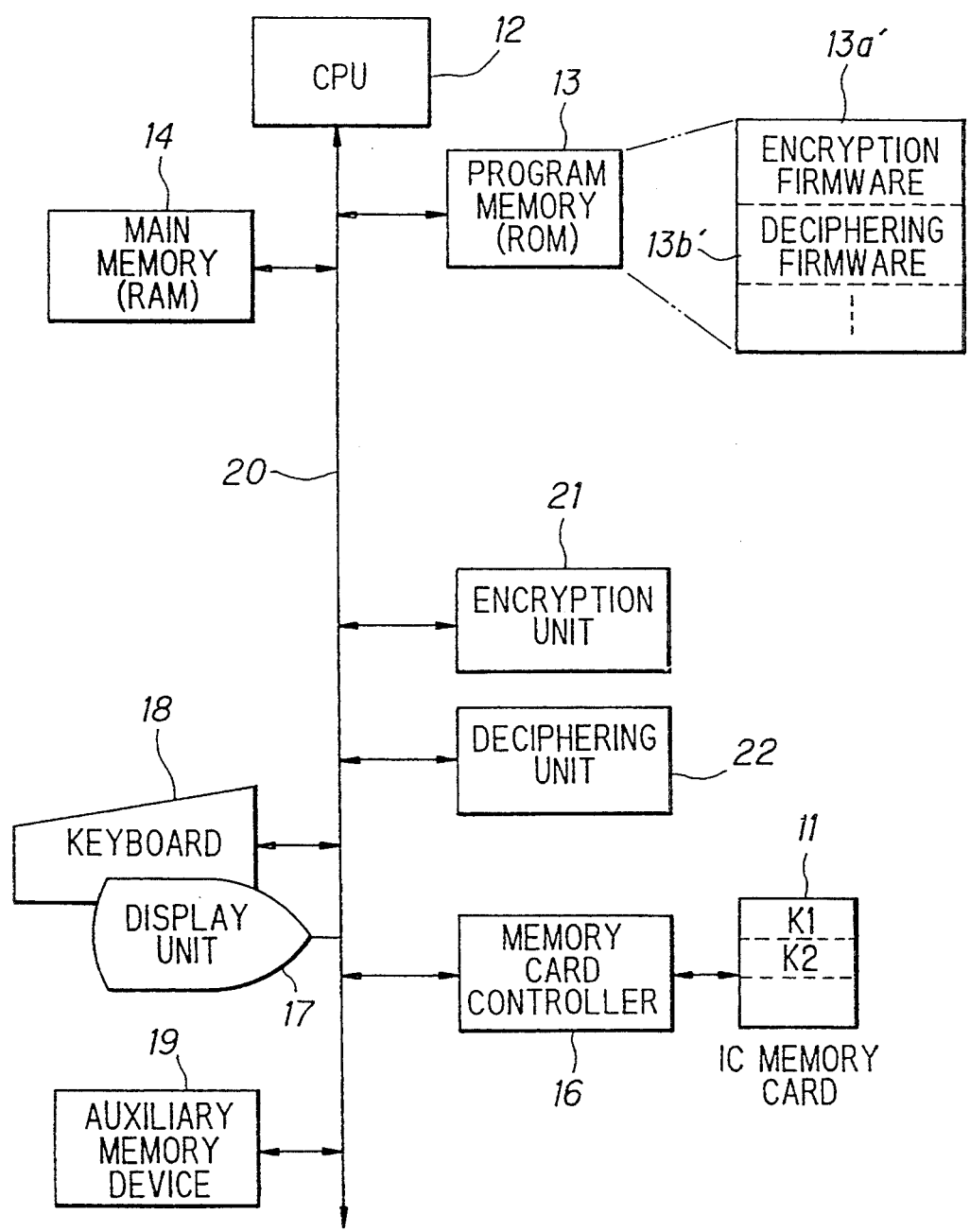
FIG. 14 is a block view of the third embodiment of the present invention.

FIG. 14 is block diagram illustrating a third embodiment of the present invention, in which elements identical with those of the second embodiment of FIG. 6 are designated by like reference characters. This embodiment differs from the second embodiment in that there are provided an encryption unit 21 and a deciphering unit 22 each having a pattern generator, wherein encryption processing is executed by the encryption unit 21 and decoding processing by the deciphering unit 22.

In FIG. 14, numeral 11 denotes the IC memory card serving as an external storage medium. This IC memory card, which has the construction shown in FIG. 7, includes the attribute memory area 11a in which the items of first and second data K1, K2 are written. Numeral 12 the processor (CPU) of the computer system; 13 a program memory (ROM) for storing various software for control; 13a' encryption firmware for performing encryption processing; 13b' deciphering firmware for performing deciphering processing; 14 the main memory device (RAM) for storing data; 21 the encryption unit for encrypting data; and 22 the deciphering unit for decoding encrypted data, which has been read out of the IC memory card 11, into the original data. The encryption unit 21 encrypts data, which is to be written in the IC memory card 11, using pattern data outputted by the internal pattern generator. The deciphering unit 22 restores data, which has been read out of the IC memory card, to the original data using the pattern generator similarly outputted by the internal pattern generator.

Numeral 16 denotes the memory-card controller (read/write controller) for writing in encrypted data at a location on the IC memory card indicated by an encrypted address obtained by an encrypted and for reading out encrypted data from a location on the IC memory card; 17 the display unit such as a CRT or liquid-crystal panel; 18 the keyboard; 19 the auxiliary memory device such as a hard disk or floppy disk; and 20 the bus.

Encryption Unit

Figure 15:
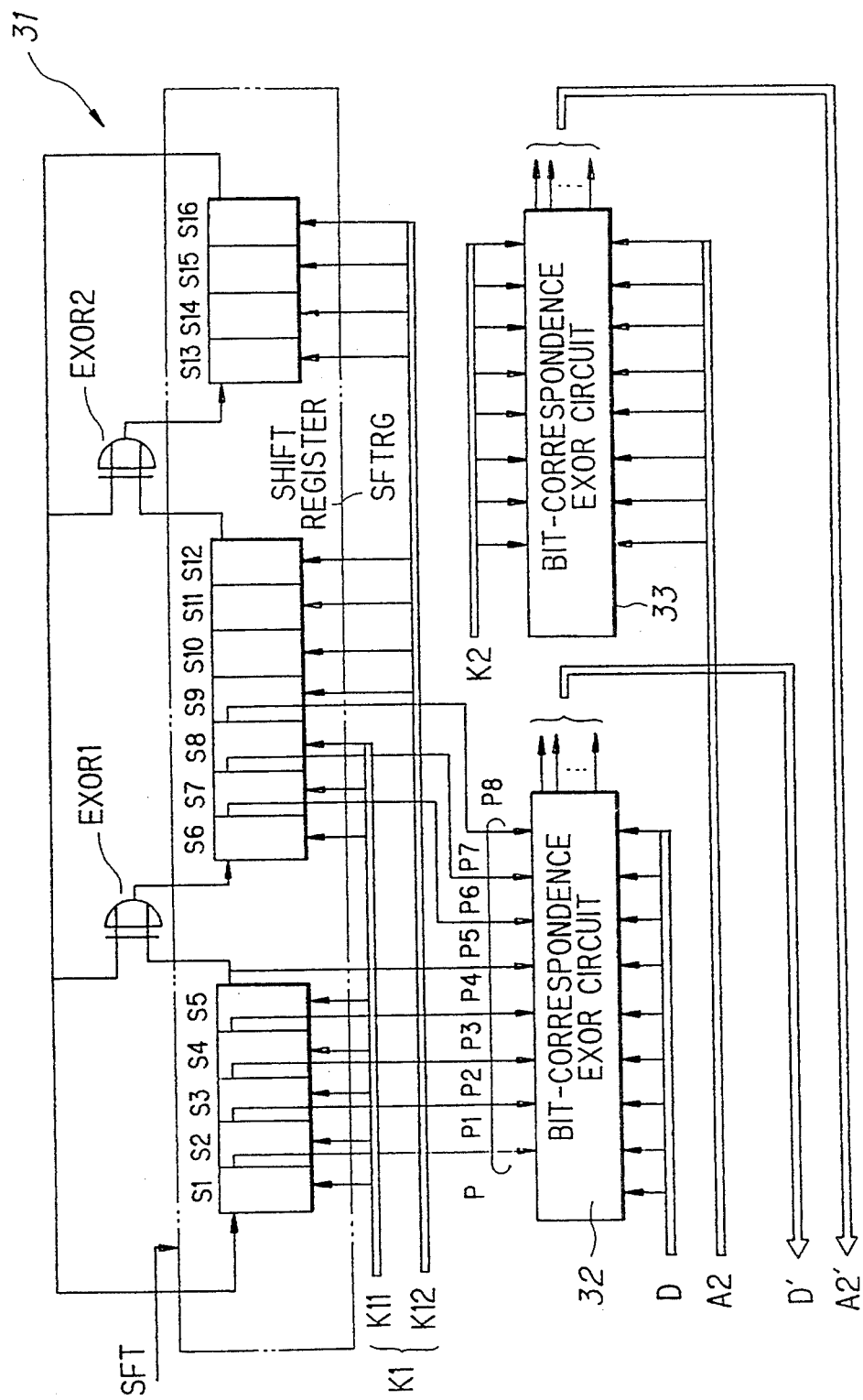
FIG. 15 is a diagram of the construction of an encryption unit.

As shown in FIG. 15, the encryption unit 21 has a pattern generator 31 for outputting pattern data P used when performing encryption, a bit-correspondence EXOR circuit 32 for encrypting data D by an exclusive-OR operation, and a bit-correspondence EXOR circuit 33 for converting address data A2 into another address A2' by an exclusive-OR operation.

The pattern generator 31 has a construction entirely identical with that of the pattern generator 15 shown in FIG. 8. The bit-correspondence EXOR circuit 32 produces an output of encrypted data D' by performing an exclusive-OR operation between corresponding bits of one byte of pattern data P outputted by the pattern generator 31 and one byte of write data D. The bit-correspondence EXOR circuit 33 converts the address A to another address A2' by performing an exclusive-OR operation between corresponding bits of one byte of second key data K2 and one lower order byte of the destination address A2 for data storage.

Deciphering Unit

Figure 16:
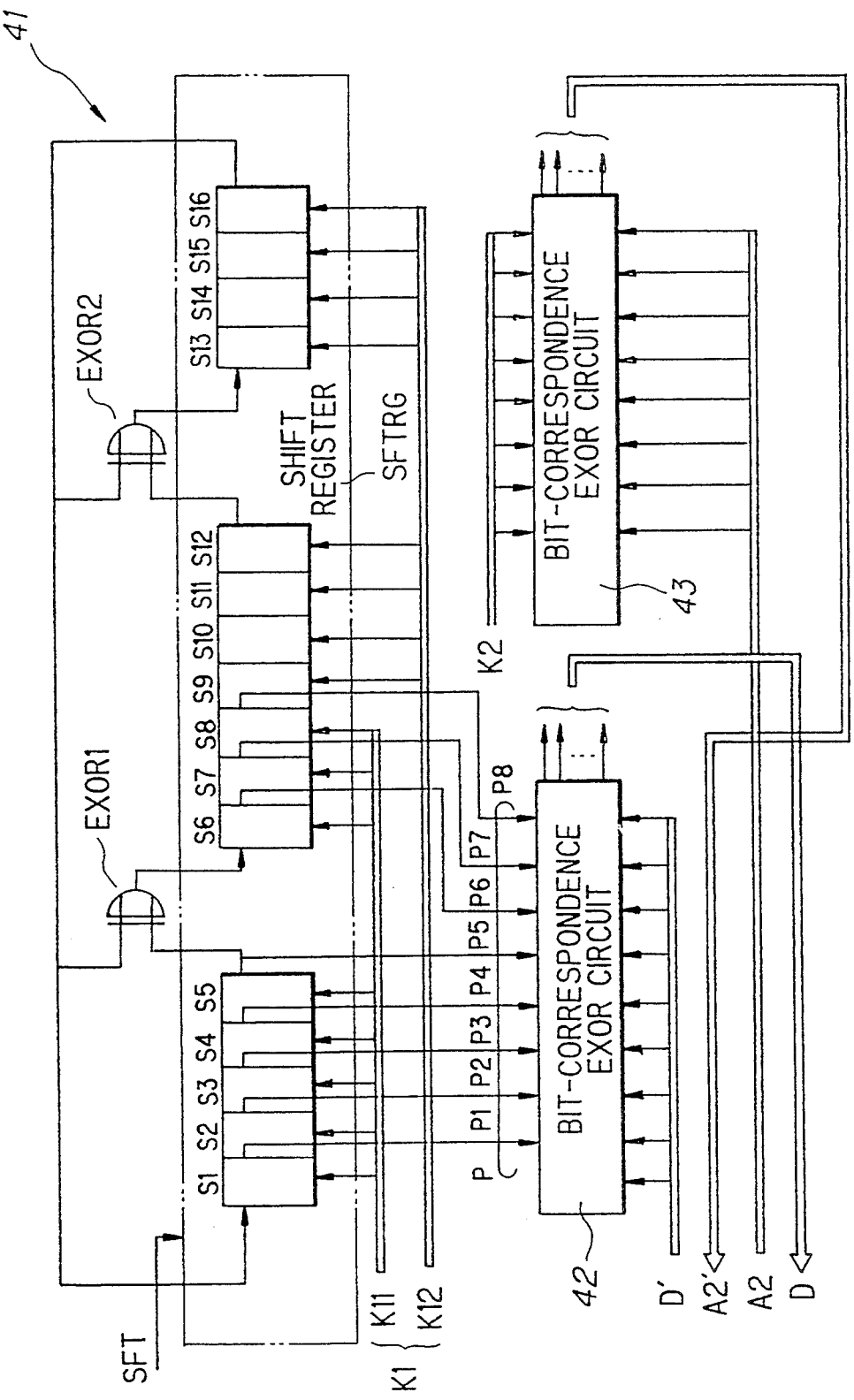
FIG. 16 is a diagram of the construction of a deciphering unit.

As shown in FIG. 16, the deciphering unit 22 has a pattern generator 41 for outputting pattern data P used when deciphering is performed, a bit-correspondence EXOR circuit 42 for deciphering coded data D' by an exclusive-OR operation, and a bit-correspondence EXOR circuit 43 for converting address data A2 into another address A2' by an exclusive-OR operation. The pattern generator 41 has a construction entirely identical with that of the pattern generator 15 shown in FIG. 8. The bit-correspondence EXOR circuit 42 restores and outputs the original data D by performing an exclusive-OR operation between corresponding bits of one byte of pattern data P outputted by the pattern generator 41 and one byte of encrypted data D'. The bit-correspondence EXOR circuit 43 converts the address A2 to another address A2' by performing an exclusive-OR operation between corresponding bits of one byte of second key data K2 and one lower order byte of the destination address A2 for data storage.

When a command is generated for writing a prescribed file, which has been stored in the main memory device 14, in the IC memory card 11, the CPU 12 decides, in accordance with the encryption firmware 13a', a read starting position A1 of the data constituting the file, a data quantity L and a head write-in address A2 in the IC memory card 11. The CPU 12 then reads the first and second key data K1, K2 out of the attribute memory area 11a of the IC memory card 11 and loads the data in the pattern generator 31 of the encryption unit 21. The CPU subsequently reads one byte of data D from the address A1 of the main memory device 14 and inputs the data D and the write address A2 to the encryption unit 21.

The bit-correspondence EXOR circuit 32 of the encryption unit 21 encrypts the data D to D' by performing the exclusive-OR operation between corresponding bits of the data D and the pattern data P outputted by the pattern generator 31. Further, the bit-correspondence EXOR circuit 33 converts the address A2 to A2' by performing the exclusive-OR operation between corresponding bits of the eight lower order bits of the write address A2 and the second key data K2.

When the encrypted data D' and the encrypted address A2' are obtained, the CPU 12 controls the memory card controller 16 so that the coded data D' is written in the IC memory card 11 at the storage area thereof designated by the address A2'. When writing ends, the CPU 12 increments the read address A1 and the write address A2, outputs the shift command to the encryption unit 21 and causes the contents of the shift register SFTRG in the pattern generator 31 to be shifted to the right by one bit. Thereafter, and in similar fashion, files are encrypted and then written at random address locations.

Deciphering Processing

When a command is generated for reading a prescribed file, which has been stored in the IC memory card 11, out to the main memory device 14, the CPU 12 decides, in accordance with the deciphering firmware 13b', a read starting position A2 of the file, a data quantity L and a head write-in address A1 in the main memory device. Next, the items of first and second key data K1, K2 are read out of the attribute memory area 11a of the IC memory card 11, and these items of data are loaded in the pattern generator 41 of the deciphering unit 22.

The bit-corresponding EXOR circuit 43 of the deciphering unit 22 converts the address A2 to A2' by performing the exclusive-OR operation between corresponding bits of the eight lower order bits of the read address A2 and the second key data K2. When the converted address A2' is obtained, the CPU 12 controls the memory card controller 16 so that the data D' is read out of the IC memory card 11 from the storage area thereof designated by the address A2'. The data D' is applied to the deciphering unit 22.

The bit-corresponding EXOR circuit 42 of the deciphering unit 22 restores the original data D by performing the exclusive-OR operation between corresponding bits of the encrypted data D' and the pattern P outputted by the pattern generator 41. The CPU 12 stores the data D at address A1 of the main memory device 14, increments the read address A2 of the IC memory card and the write address A1 of the main memory device, outputs the shift command to the pattern generator 41 of the deciphering unit 22 encryption unit 21 and causes the contents of the shift register SFTRG to be shifted to the right by one bit. Thereafter, and in similar fashion, files are read out of the main memory device while being deciphered.

In the foregoing the items of first and second key data K1, K2 are made to differ. However, identical data also can be used, or part of the first key data K1 can be made the second key data K2. If this expedient is adopted, encryption and deciphering can be performed merely by storing solely the first key data.

Further, though it has been described that the encryption operation and deciphering operation are exclusive-OR operations (EXOR operations), encryption and deciphering can be performed even if the encryption operation and deciphering operation are EXNOR operations. Further, encryption and deciphering can be performed even if the encryption operation is made an addition or subtraction operation in which carries and borrows are ignored and the deciphering operation is made a subtraction or addition operation in which carries and borrows are ignored.

In accordance with the present invention, when a file is written in an IC memory card, second key data, which is inserted into a header of the file, is decided and written in a RAM area in such a manner that a fixed correlation will exist with regard to first key data stored in a ROM area of the IC memory card. In the reading of a file out of the IC memory card, file read-out is made possible only if the fixed correlation holds between the first key data that has been written in the ROM area of the IC memory card and the second key data contained in the header of the file. If the fixed correlation does not hold, read-out of the file is made impossible. Therefore, even if a master card is copied, files cannot be read from the card copy. This makes it possible to prevent copying.

Further, in accordance with the invention, first key data K1 is written in the ROM area of the IC memory card in advance and the first key data is made to differ for every IC memory card. When data is written in the IC memory card, the data to be written in the IC memory card is written upon being encrypted using the first key data K1. When data is read out of the IC memory card, the read data is deciphered into the original data using the first key data. Therefore, even if data that has been stored in the RAM area of a master card is copied onto another IC memory card, the original data cannot be recovered from the card copy. Accordingly, it is meaningless to copy the master card and copying can be prevented as a result. This is useful in terms of copyright protection.

Furthermore, in accordance with the invention, second key data K2 is written in the ROM area of the IC memory card in advance and the second key data K2 is made to differ for every IC memory card. When data is written in the IC memory card, the data is written upon converting a data-storage destination address of the IC memory card into another address using the key data K2. When data is read out of the IC memory card, the data is read out upon converting a data-read-out address into another address using the key data K2. Accordingly, even if data that has been recorded in the RAM area of a master card is copied to another IC memory card, the original data cannot be recovered from the card copy.

Further, in accordance with the invention, items of first and second key data K1, K2 are written in the ROM area of an IC memory card in advance, and both data and address data to be written in the IC memory card are encrypted using the first and second key data. This enhances confidentiality. Moreover, since data is encrypted using pattern data generated pseudo-randomly by a pattern generator, confidentiality is enhanced further.

Further, in accordance with the present invention, a variety of pattern data can be generated by loading the first key data in the pattern generator whenever the IC memory card has been accessed a predetermined number of times. This makes it possible to reinforce the protection of data stored in the IC memory card.

What is claimed is:

1. A method of protecting data recorded on an IC memory card used as an external storage medium of a computer system and having a first area and a second area, wherein first key data is stored in the first area, the method comprising:
 a step of writing a file in the second area;
 a step, executed when the file is written in the second area of the IC memory card, of deciding second key data, which is inserted into a header of the file, such that a fixed correlation is provided with respect to the first key data stored in the first area of the IC memory card, and writing a file in which the second key data is inserted in the second area;
 a step of reading out a file from the IC memory card;
 a step, executed when the file is read out of the IC memory card, of checking to determine whether the fixed correlation holds between the first key data that has been stored in the first area of the IC memory card and the second key data that has been inserted in the header of said file; and
 a step of reading out said file if the fixed correlation holds between the first and second key data, and not reading out said file if the fixed correlation does not hold.

2. A method of protecting data recorded on an IC memory card used as an external storage medium of a computer system and having a first area and a second area, the method comprising:
 a step of writing a file in said first area of the IC memory card;
 a step, executed at said writing step, of deciding first and second key data in such a manner that a fixed correlation is provided between the first and second key data;
 a step of writing the first key data in the first area, inserting the second key data in a header of a file and writing the file in the second area;
 a step of reading a file out of the IC memory card;
 a step executed at said reading step, of checking to determine whether the fixed correlation holds between the first key data that has been written in the first area of the IC memory card and the second key data that has been inserted in the header of said file; and
 a step of reading out said file if the fixed correlation holds, and not reading out said file if the fixed correlation does not hold.

3. A method of protecting data in an IC memory card according to claim 2, wherein a device for writing files in the IC memory card and a device for reading files out of the IC memory card are separately provided.

4. A method of protecting data recorded on an IC memory card used as an external storage medium of a computer system and having a first area and a second area, the method comprising:
 a step of writing first key data for preventing copying in the first area of the IC memory card in advance, and making the first key data differ from one IC memory card to another IC memory card in advance;
 a step of writing a file in the second area;
 a step, executed when the file is written in the second area of the IC memory card, of reading out the first key data for preventing copying that has been stored in the first area;
 a step of deciding second key data in such a manner that a fixed correlation will hold with respect to said first key data;
 a step of inserting said second key data in a header of the file and writing the file in the second area;
 a step of reading out a file from the IC memory card;

a step, executed when the file is read out of the IC memory card, of checking to determine whether said fixed correlation holds between the first key data that has been written in the first area and the second key data that has been inserted in the header of said file;

a step of allowing read-out of said file if the fixed correlation holds, and inhibiting read-out of said file if the fixed correlation does not hold.

5. A method of protecting data in an IC memory card according to claim 4, wherein a device for writing files in the IC memory card and a device for reading files out of the IC memory card are separately provided.

6. A method of protecting data recorded on an IC memory card used as an external storage medium of a computer system and having a first area and a second area, the method comprising:

a step of writing first key data K1 in the first area of the IC memory card in advance, and making the first key data differ from one IC memory card to another IC memory card in advance;

a step of writing data in the IC memory card;

a step, executed when data is written in the IC memory card, of encrypting the data, which is to be written in the IC memory card, using the first key data K1;

a step of reading out data from the IC memory card; and a step, executed when data is read out of the IC memory card, or deciphering the read data into original data using the first key data.

7. A method of protecting data in an IC memory card according to claim 6, further comprising:

a step of writing second key data K2 in the first area of the IC memory card in advance, and making said second key data K2 differ from one IC memory card to another IC memory card in advance;

a step, executed when data is written in the IC memory card, of converting a data-storage destination address of the IC memory card into another address using the second key data K2, and writing said encrypted data in the IC memory card at a location thereof indicated by the address obtained by the address conversion; and a step, executed when data is read out of the IC memory card, of converting a data-read-out address into another address using the second key data K2, reading data out of the IC memory card from a location thereof indicated by the address obtained by said address conversion, and subjecting said read data to said deciphering step.

8. A method of protecting data according to claim 6, comprising:

providing a pattern generator;

a step, executed when data is written in the IC memory card, of loading said first key data K1 in the pattern generator as initial pattern data, generating successively different pattern data in said pattern generator, and changing pattern data, which is used in order to perform encryption, whenever data is written in the IC memory card; and a step, executed when data is read out of the IC memory card, of loading said first key data K1 in the pattern generator as initial pattern data, generating successively different pattern data in said pattern generator, and changing pattern data, which is used in order to perform deciphering, whenever data is read out of the IC memory card.

9. A method of protecting data in an IC memory card according to claim 8, wherein said encryption and deciphering steps are performed by exclusive-OR operations.

10. A method of protecting data in an IC memory card according to claim 8, wherein said encryption step is performed by one of addition and subtraction operation in which carries and borrows are ignored, and the deciphering step is performed by one of subtraction and addition operation in which carries and borrows are ignored.

11. A method of protecting data in an IC memory card according to claim 8, wherein said pattern data is initialized whenever the IC memory card is accessed a predetermined number of times.

12. A method of protecting data recorded on an IC memory card used as an external storage medium of a computer system and having a first area and a second area, the method comprising:

a step of writing key data K2 in the first area of an IC memory card in advance, and making said key data differ from one IC memory card to another IC memory card in advance;

a step, executed when data is written in the IC memory card, of converting a data-storage destination address of the IC memory card into another address using the key data K2, and writing said data in the IC memory card at a location thereof indicated by the address obtained by the address conversion; and a step, executed when data is read out of the IC memory card, of converting a data-read-out address into another address using the key data K2, and reading data out of the IC memory card from a location thereof indicated by the address obtained by said address conversion.

13. An IC memory card used as an external storage medium of a computer system, comprising:

a first storage area and a second storage area; and wherein key data for preventing copying is written in the first area in advance and said key data is made to differ from one IC memory card to another.

14. An IC memory card used as an external storage medium of a computer system, comprising:

a first storage area and a second storage area; and wherein first key data K1 used to encrypt and decipher data stored in the second area and second key data K2 used in order to make an address conversion is written in the first area in advance, the first key data and the second key data being made to differ from one IC card to another.

15. IC memory card writing apparatus for protecting data recorded on an IC memory card used as an external storage medium of a computer system and having a first storage area and a second storage area, the apparatus comprising:

deciding means for deciding, when a file is written in the second storage area of the IC memory card, second key data, which is inserted into a header of the file, in such a manner that a fixed correlation is provided with respect to first key data stored in the first storage area of the IC memory card; and write control means for writing the file in the second storage area after inserting the second key data into the header of the file.

16. IC memory card reading apparatus for protecting data recorded on an IC memory card used as an external storage medium of a computer system and having a first storage area and a second storage area, the apparatus comprising:

checking means for checking, when a file is read out of the IC memory card, to determine whether a fixed correlation holds between first key data that has been written is the first storage area of the IC memory card and second key data that has been inserted in a header of the file; and read control means for reading out said file if the fixed correlation holds between the first and second key data, and not reading out said file if the fixed correlation does not hold.

17. IC memory card writing/reading apparatus for protecting data recorded on an IC memory card used as an external storage medium of a computer system and having a first storage area storing first key data and a second storage area, the apparatus comprising:

deciding means, for deciding when a file is written in the second storage area of the IC memory card, second key data, which is inserted into a header of the file, in such a manner that a fixed correlation is provided with respect to the first key data stored in the first storage area of the IC memory card;

write control means for writing the file in the second storage area after inserting the second key data into the header of the file;

checking means for checking, when a file is read out of the IC memory card, to determine whether the fixed correlation holds between the first key data that has been stored in the first storage area of the IC memory card and the second key data that has been inserted in the header of said file; and read control means for reading out said file if the fixed correlation holds between the first and second key data, and not reading out said file if the fixed correlation does not hold.

18. IC memory card writing apparatus for protecting data recorded on an IC memory card used as an external storage medium of a computer system and having a first storage area and a second storage area, the apparatus comprising:

deciding means for deciding, when writing a file in the second storage area of the IC memory card, first and second key data in such a manner that a fixed correlation is provided therebetween; and write control means for writing the first key data in the first storage area, inserting the second key data in a header of a file and writing the file in the second storage area.

19. IC memory card writing/reading apparatus for protecting data recorded on an IC memory card used as an external storage medium of a computer system and having first storage area and a second storage area, the apparatus comprising:

deciding means for deciding, when writing a file in the second storage area of the IC memory card, first and second key data in such a manner that a fixed correlation is provided therebetween;

write control means for writing the first key data in the first storage area, inserting the second key data in a header of a file and writing the file in the second storage area;

checking means for checking, when reading a file out of the IC memory card, to determine whether the fixed correlation holds between the first key data that has been written in the first storage area of the IC memory card and the second key data that has been inserted in the header of said file; and read control means for reading out said file if the fixed correlation holds, and not reading out said file if the fixed correlation does not hold.

20. IC memory card writing apparatus for protecting data recorded on an IC memory card used as an external storage medium of a computer system and having a first storage area and a second storage area, the apparatus comprising:

writing means for writing first key data for preventing copying in the first storage area of the IC memory card in advance, and making the first key data differ from one IC memory card to another;

reading means for reading out, when a file is written in a second area of the IC memory card, the first key data for preventing copying that has been stored in the first storage area;

deciding means for deciding second key data in such a manner that a fixed correlation will hold with respect to said first key data; and means for inserting said second key data in a header of the file and writing the file in the second storage area.

21. IC memory card reading apparatus for protecting data recorded on an IC memory card used as an external storage medium of a computer system and having a first storage area and a second storage area, comprising:

writing means for writing first key data for preventing copying in the first storage area of the IC memory card in advance, and making the first key data differ from one IC memory card to another;

checking means for checking, when a file is read out of the IC memory card, to determine whether a fixed correlation holds between the first key data that has been written in the first storage area and second key data that has been inserted in a header of the file; and means for allowing read-out of said file if the fixed correlation holds, and inhibiting read-out of said file if the fixed correlation does not hold.

22. IC memory card reading/writing apparatus for protecting data recorded on an IC memory card used as an external storage medium of a computer system and having a first storage area and a second storage area, the apparatus comprising:

means for writing first key data for preventing copying in the first storage area of the IC memory card in advance, and making the first key data differ from one IC memory card to another;

means for reading out, when a file is written in the second storage area of the IC memory card, the first key data for preventing copying that has been stored in the first storage area;

means for deciding second key data in such a manner that a fixed correlation will hold with respect to said first key data;

means for inserting said second key data in a header of the file and writing the file in the second storage area;

checking means for checking, when a file is read out of the IC memory card, to determine whether said fixed correlation holds between the first key data that has been written in the first storage area and the second key data that has been inserted in a header of the file; and means for allowing read-out of said file if the fixed correlation holds, and inhibiting read-out of said file if the fixed correlation does not hold.

23. IC memory card writing apparatus for protecting data recorded on an IC memory card used as an external storage medium of a computer system and having a first storage area and a second storage area, the apparatus comprising:
- first means for writing first key data K1 in the first storage area of the IC memory card in advance, and making the first key data K1 differ from one IC memory card to another;
- second means for encrypting, when data is written in the IC memory card, the data, which is to be written in the IC memory card, using the first key data K1; and
- third means for writing the encrypted data in the IC memory card.

24. IC memory card writing apparatus according to claim 23, wherein second key data K2 is written in the first storage area of the IC memory card in advance so that said second key data K2 differs from one IC memory card to another and when data is written in the IC memory card, said third means converts a data-storage destination address of the IC memory card into another address using the second key data K2 and writes said encrypted data in the IC memory card at a location thereof indicated by the address obtained by the address conversion.

25. IC memory card writing apparatus according to claim 23, wherein a pattern generator is provided and when data is written in the IC memory card, said first key data K1 is loaded in the pattern generator as initial pattern data, then the pattern generator generates successively different pattern data so that pattern data, which is used in order to perform encryption, changes whenever data is written in the IC memory card.

26. IC memory card reading apparatus for protecting data recorded on an IC memory card used as an external storage medium of a computer system and having a first storage area and a second storage area, the apparatus comprising:
- first means for writing first key data K1 in the first storage area of the IC memory card in advance, and making the first key data K1 differ from one IC memory card to another;
- second means for reading data out of the IC memory card; and
- third means for deciphering the read data into original data using the first key data K1.

27. IC memory card reading apparatus according to claim 26, wherein second key data K2 is written in the first storage area of an IC memory card in advance so that said second key data K2 differ from one IC memory card to another, and when data is read out of the IC memory card, said second means converts a data-read-out address into another address using the second key data K2 and reads data out of the IC memory card from a location thereof indicated by the address obtained by said address conversion, and said third means subjects said read data to said deciphering.

28. IC memory card reading apparatus according to claim 26, wherein a pattern generator is provided and when data is read out of the IC memory card, said first key data K1 is loaded in the pattern generator as initial pattern data and the pattern generator generates successively different pattern data so that pattern data, which is used in order to perform deciphering, changes whenever data is read out of the IC memory card.

29. IC memory card writing/reading apparatus for protecting data recorded on an IC memory card used as an external storage medium of a computer system and having a first storage area and a second storage area, the apparatus comprising:
- first means for writing first key data K1 in the first area of the IC memory card in advance, and making the first key data K1 differ from one IC memory card to another;
- second means for encrypting, when data is written in the IC memory card, the data, which is to be written in the IC memory card, using the first key data K1;
- third means for writing the encrypted data in the IC memory card;
- fourth means for reading data out of the IC memory card; and
- fifth means for deciphering the read data into original data using the first key data K1.

30. IC memory card writing/reading apparatus according to claim 29, wherein second key data K2 is written in the first storage area of the IC memory card in advance so that said second key data K2 differs from one IC memory card to another;
and wherein:
- when data is written in the IC memory card, said third means converts a data-storage destination address of the IC memory card into another address using the second key data K2 and writes said encrypted data in the address obtained by the address conversion; and
- when data is read out of the IC memory card, said fourth means converts a data-read-out address into another address using the second key data K2 and reads data out of the IC memory card from a location thereof indicated by the address obtained by said address conversion, and said fifth means subjects said read data to said deciphering.

31. IC memory card writing/reading apparatus according to claim 29, wherein a pattern generator is provided and wherein;
- when data is written in the IC memory card, said first key data K1 is loaded in the pattern generator as initial pattern data, and the pattern generator generates successively different pattern data so that pattern data, which is used in order to perform encryption, changes whenever data is written in the IC memory card; and when data is read out of the IC memory card, said first key data K1 is loaded in the pattern generator as initial pattern data and the pattern generator generates successively different pattern data so that pattern data, which is used in order to perform deciphering, changes whenever data is read out of the IC memory card.

32. IC memory card writing/reading apparatus according to claim 31, wherein said encryption and deciphering are performed by exclusive-OR operations.

33. IC memory card writing/reading apparatus according to claim 31, wherein said encryption is performed by one of addition and subtraction in which carries and borrows are ignored, and the deciphering is performed by one of subtraction and addition in which carries and borrows are ignored.

34. IC memory card writing/reading apparatus according to claim 31, wherein said pattern data is initialized whenever the IC memory card is accessed a predetermined number of times.

35. IC memory card writing apparatus for protecting data recorded on an IC memory card used as an external storage medium of a computer system and having a first storage area and a second storage area, the apparatus comprising:

first writing means for writing key data K2 in the first storage area of the IC memory card in advance so that said key data differs from one IC memory card to another;

converting means for converting, when data is written in the IC memory card, a data-storage destination address of the IC memory card into another address using the key data K2; and second writing means for writing said data in the IC memory card at a location thereof indicated by the address obtained by the address conversion.

36. IC memory card reading apparatus for protecting data recorded on an IC memory card used as an external storage medium of a computer system and having a first storage area and a second storage area, the apparatus comprising:

means for writing key data K2 in the first storage area;

means for converting, when data is read out of the IC memory card, a data-read-out address into another address using the key data K2; and means for reading data out of the IC memory card from a location thereof indicated by the address obtained by said address conversion.

37. IC memory card writing/reading apparatus for protecting data recorded on an IC memory card used as an external storage medium of a computer system and having a first storage area and a second storage area, the apparatus comprising:

first writing means for writing key data K2 in the first storage area of the IC memory card in advance so that said key data differs from one IC memory card to another;

first address converting means for converting, when data is written in the IC memory card, a data-storage destination address of the IC memory card into another address using the key data K2;

second writing means for writing said data in the IC memory card at a location thereof indicated by the address obtained by the address conversion;

second address converting means for converting, when data is read out of the IC memory card, a data-read out address into another address using the key data K2; and means for reading data out of the IC memory card from a location thereof indicated by the address obtained by said address conversion.

* * * * *